(12) United States Patent
Eikelenboom

(10) Patent No.: US 12,101,055 B2
(45) Date of Patent: Sep. 24, 2024

(54) FOLDABLE SOLAR PANEL ASSEMBLY

(71) Applicant: Axiturn B.V., Zevenhuizen (NL)

(72) Inventor: Pieter Arie Jan Eikelenboom, Zevenhuizen (NL)

(73) Assignee: Axiturn B.V., Zevenhuizen (NL)

( * ) Notice: Subject to any disclaimer, the term of this patent is extended or adjusted under 35 U.S.C. 154(b) by 104 days.

(21) Appl. No.: 17/783,825

(22) PCT Filed: Dec. 10, 2020

(86) PCT No.: PCT/EP2020/085580
§ 371 (c)(1),
(2) Date: Jun. 9, 2022

(87) PCT Pub. No.: WO2021/116309
PCT Pub. Date: Jun. 17, 2021

(65) Prior Publication Data
US 2023/0010589 A1    Jan. 12, 2023

(30) Foreign Application Priority Data
Dec. 10, 2019 (NL) ....................... 2024420

(51) Int. Cl.
*H02S 30/20* (2014.01)
*F24S 20/70* (2018.01)
*F24S 25/12* (2018.01)
*F24S 30/422* (2018.01)
*F24S 40/00* (2018.01)
*H02S 20/32* (2014.01)
*H02S 30/10* (2014.01)
*F24S 25/00* (2018.01)

(52) U.S. Cl.
CPC .............. *H02S 30/20* (2014.12); *F24S 20/70* (2018.05); *F24S 25/12* (2018.05); *F24S 30/422* (2018.05); *F24S 40/00* (2018.05); *H02S 20/32* (2014.12); *H02S 30/10* (2014.12); *F24S 2025/012* (2018.05)

(58) Field of Classification Search
CPC .......................... H02S 30/20; F24S 2025/012
See application file for complete search history.

(56) References Cited

U.S. PATENT DOCUMENTS

| | | |
|---|---|---|
| 2012/0085387 A1 | 4/2012 | French, Sr. |
| 2012/0216850 A1 | 8/2012 | Chu |
| 2014/0076378 A1 | 3/2014 | Hamilton |
| 2014/0101846 A1 | 4/2014 | Garland |
| 2016/0344330 A1* | 11/2016 | Gillis ............... H02S 20/32 |
| 2018/0238072 A1 | 8/2018 | McKinion |

FOREIGN PATENT DOCUMENTS

| | | | |
|---|---|---|---|
| DE | 19855993 A1 * | 6/2000 | ............ B64G 1/222 |
| EP | 3166221 A1 * | 5/2017 | ............ H02S 10/40 |
| KR | 10-1984650 B1 | 9/2019 | |
| WO | 2011/096007 A2 | 8/2011 | |

OTHER PUBLICATIONS

English machine translation of DE-19855993-A1 (Year: 2024).*

* cited by examiner

*Primary Examiner* — Angelo Trivisonno
(74) *Attorney, Agent, or Firm* — Hoffmann & Baron, LLP

(57) ABSTRACT

A foldable solar panel assembly is configured to support solar panels in a compact and folded, undeployed position, and in an unfolded, deployed position, and to fold and unfold between its deployed and undeployed position.

15 Claims, 30 Drawing Sheets

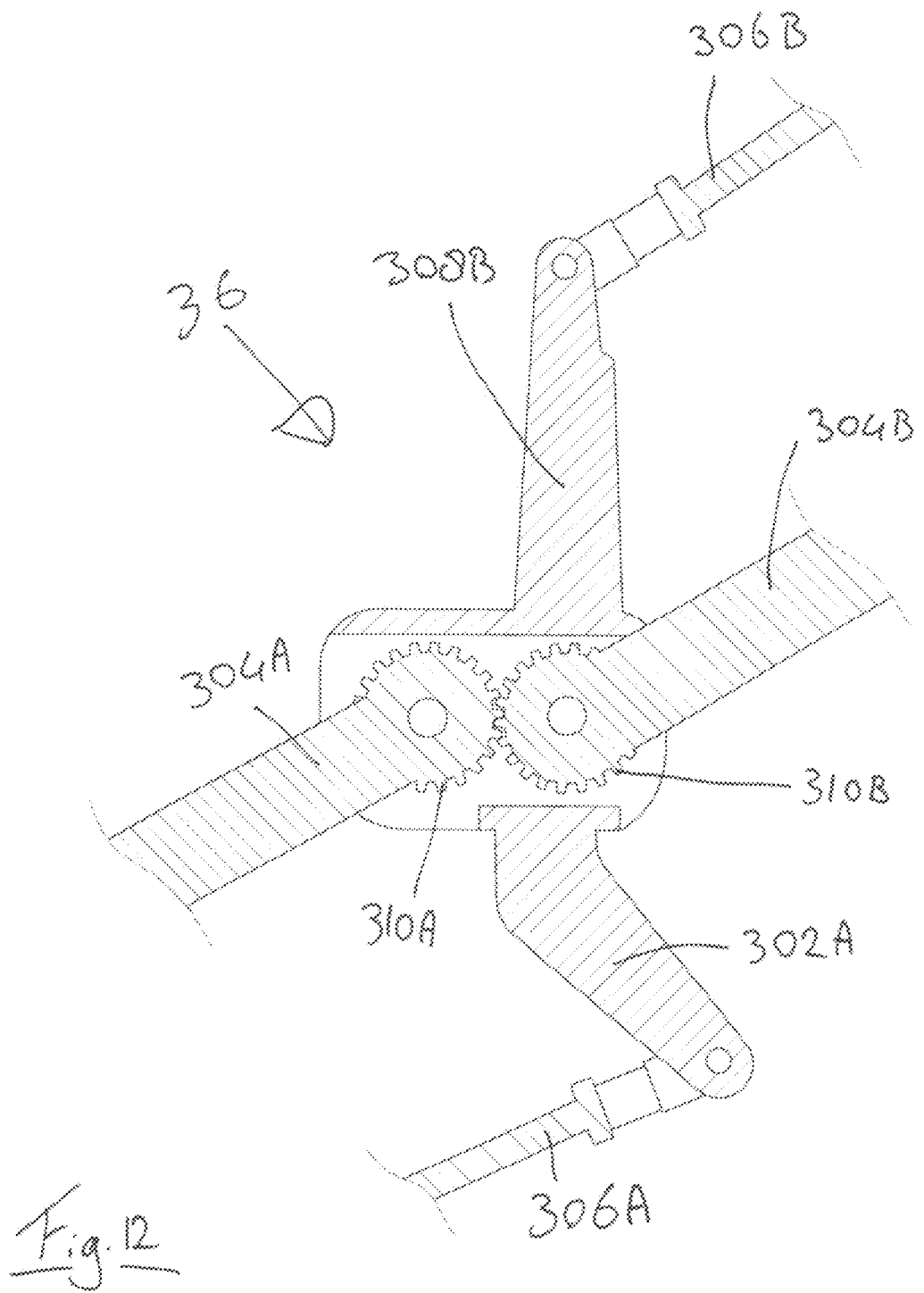

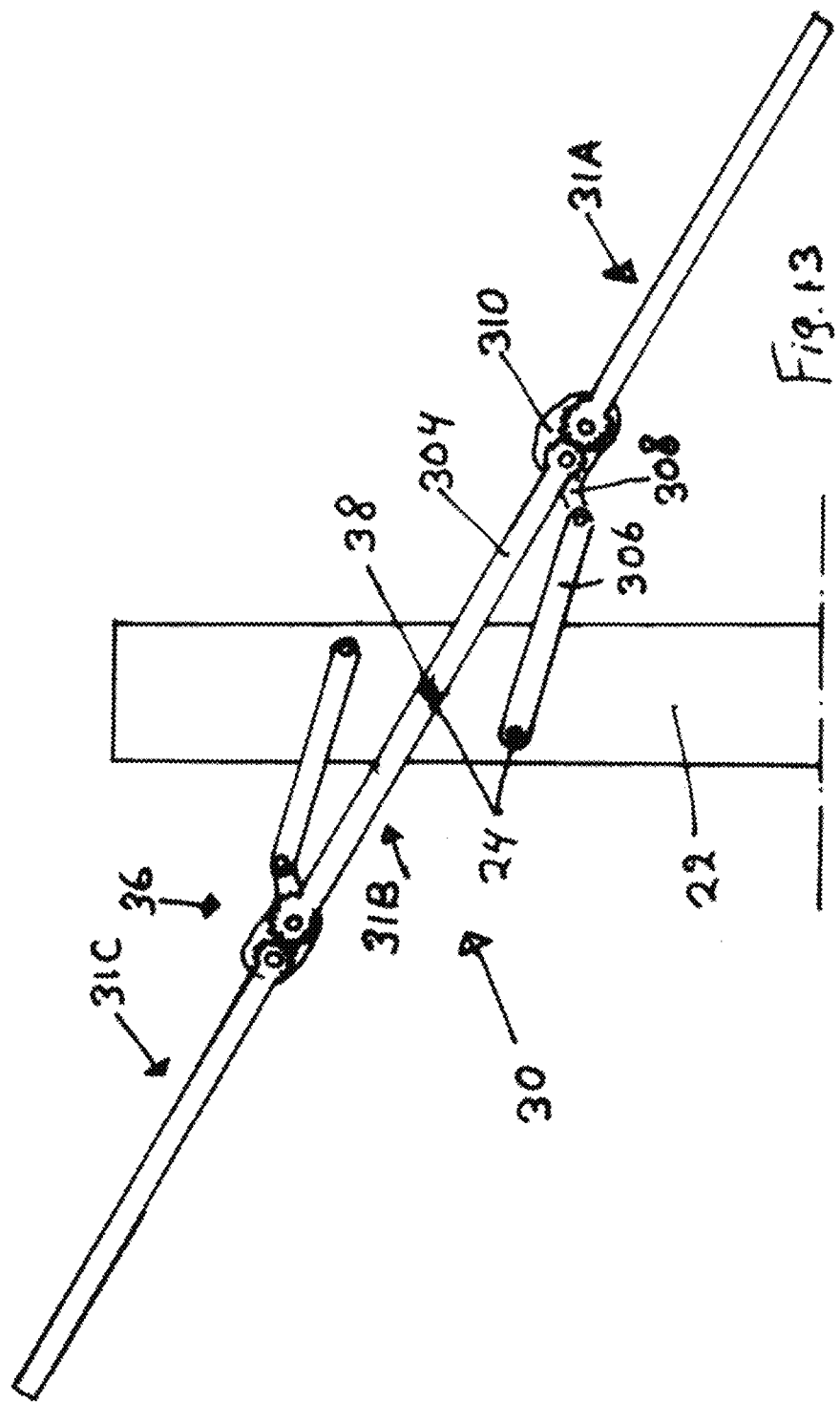

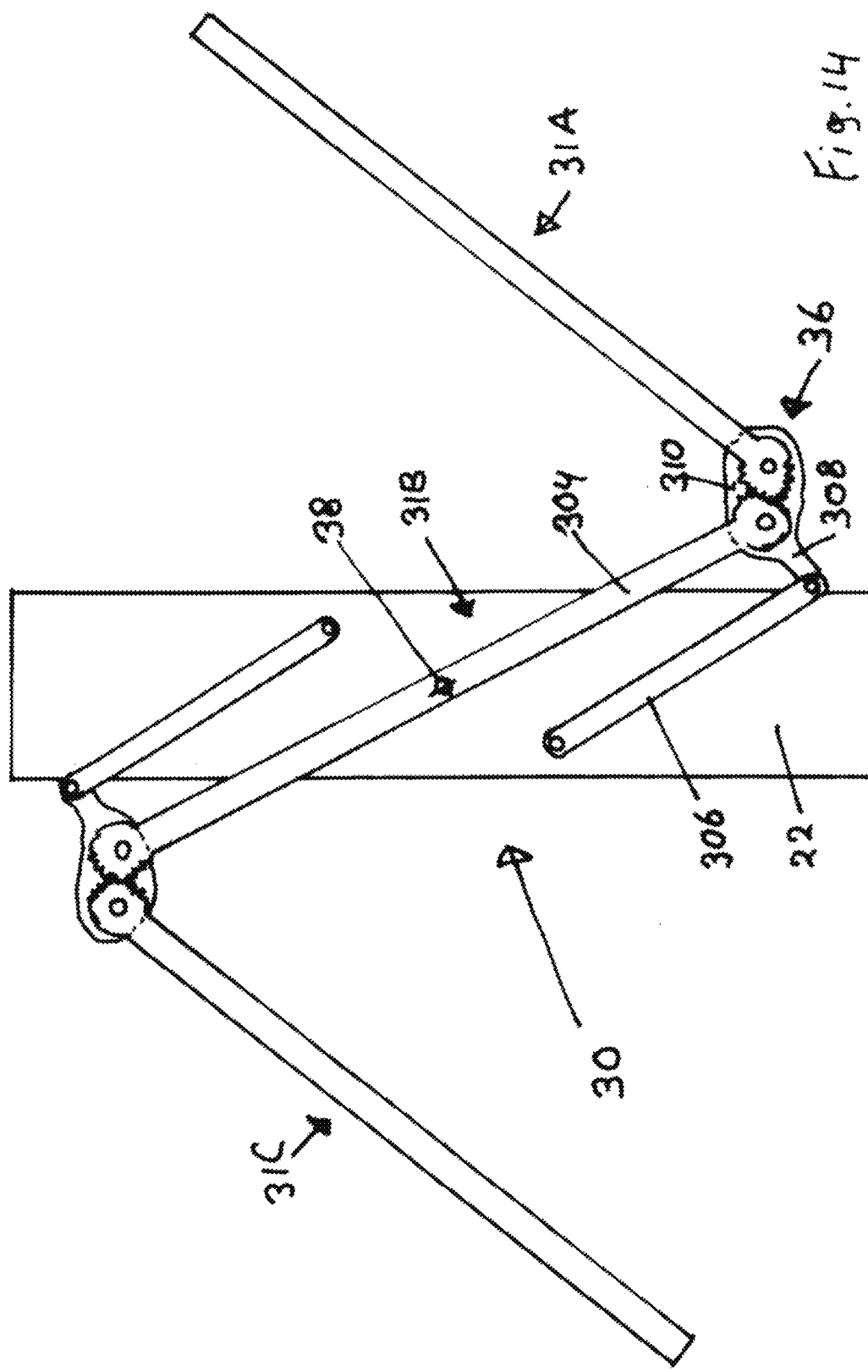

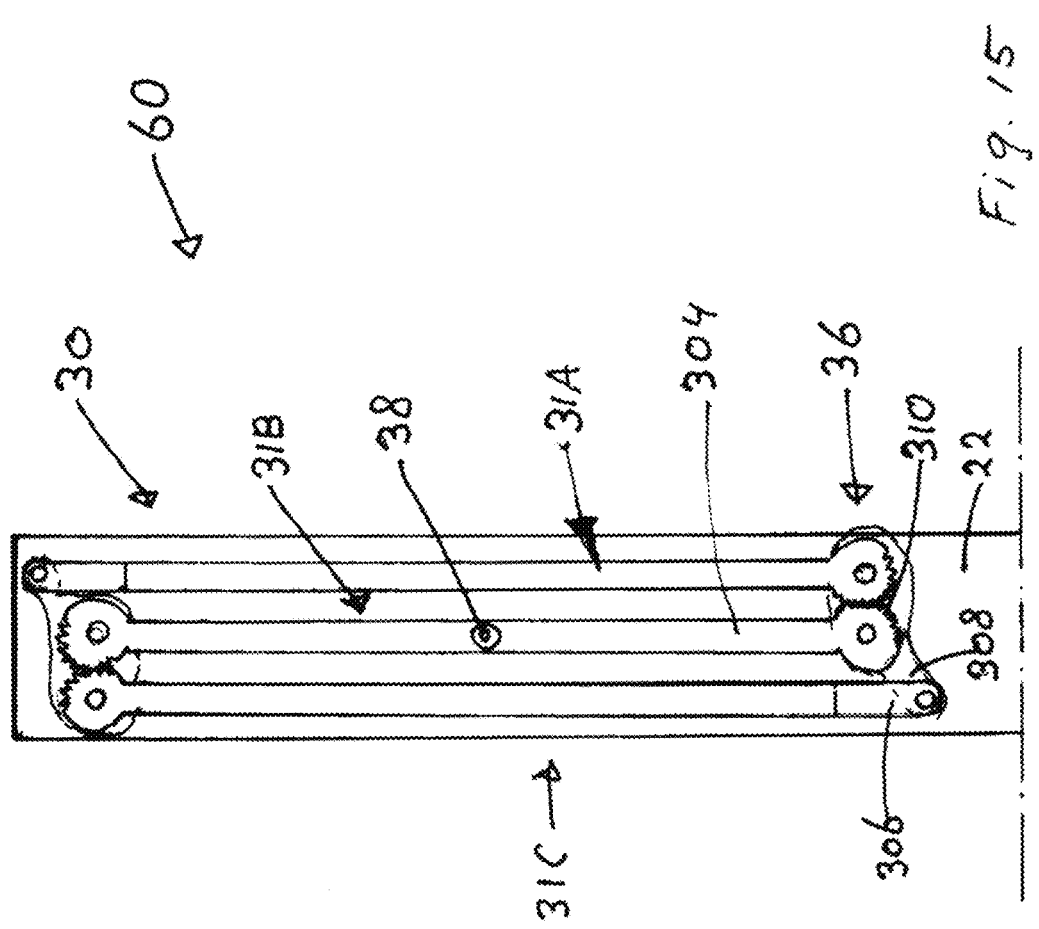

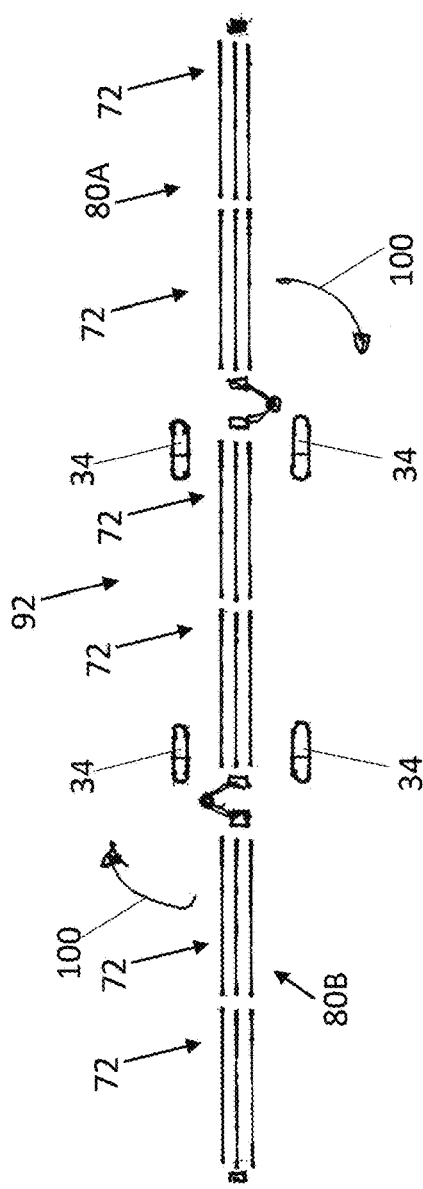
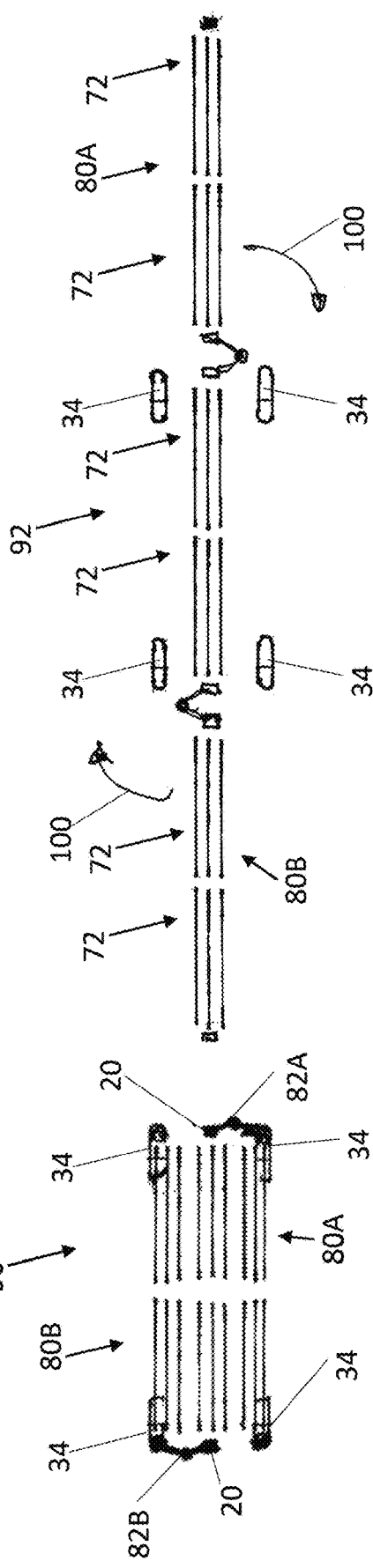
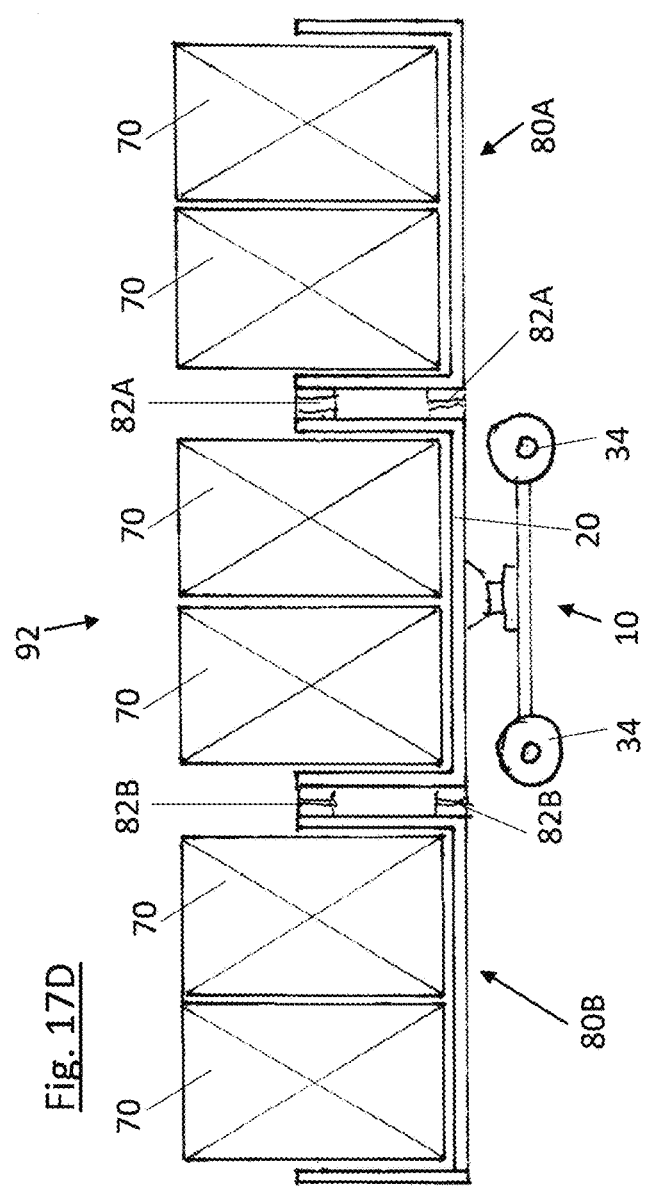
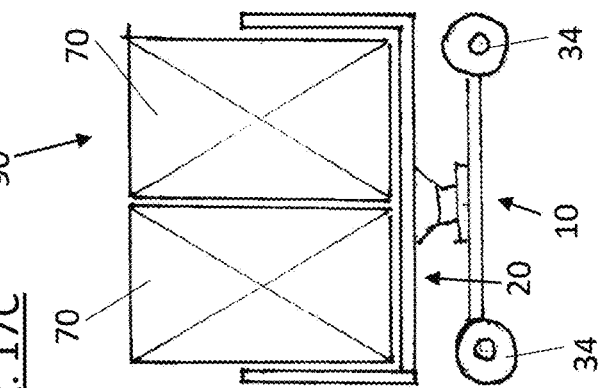

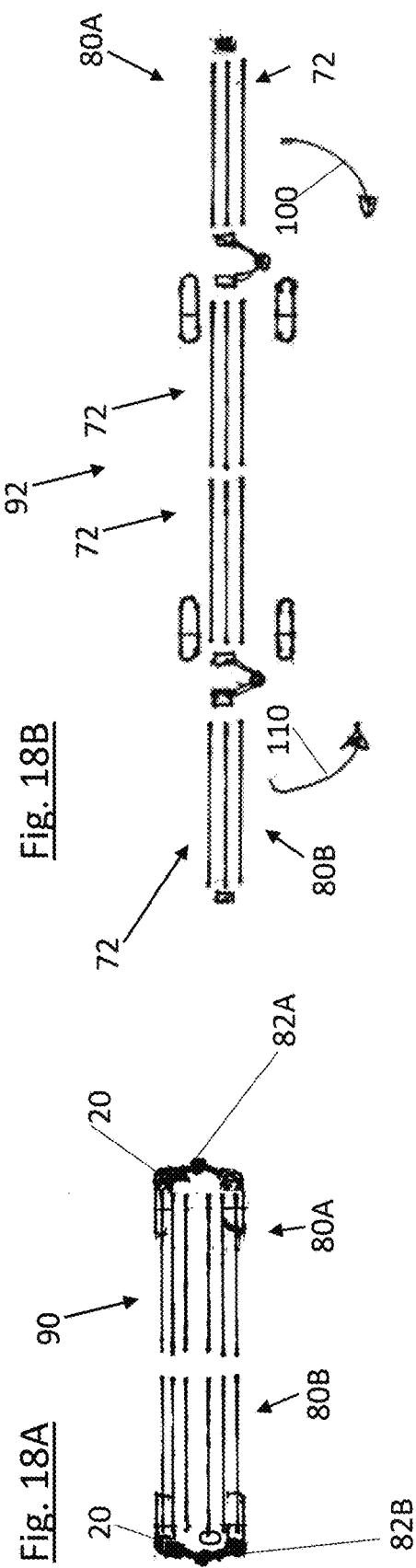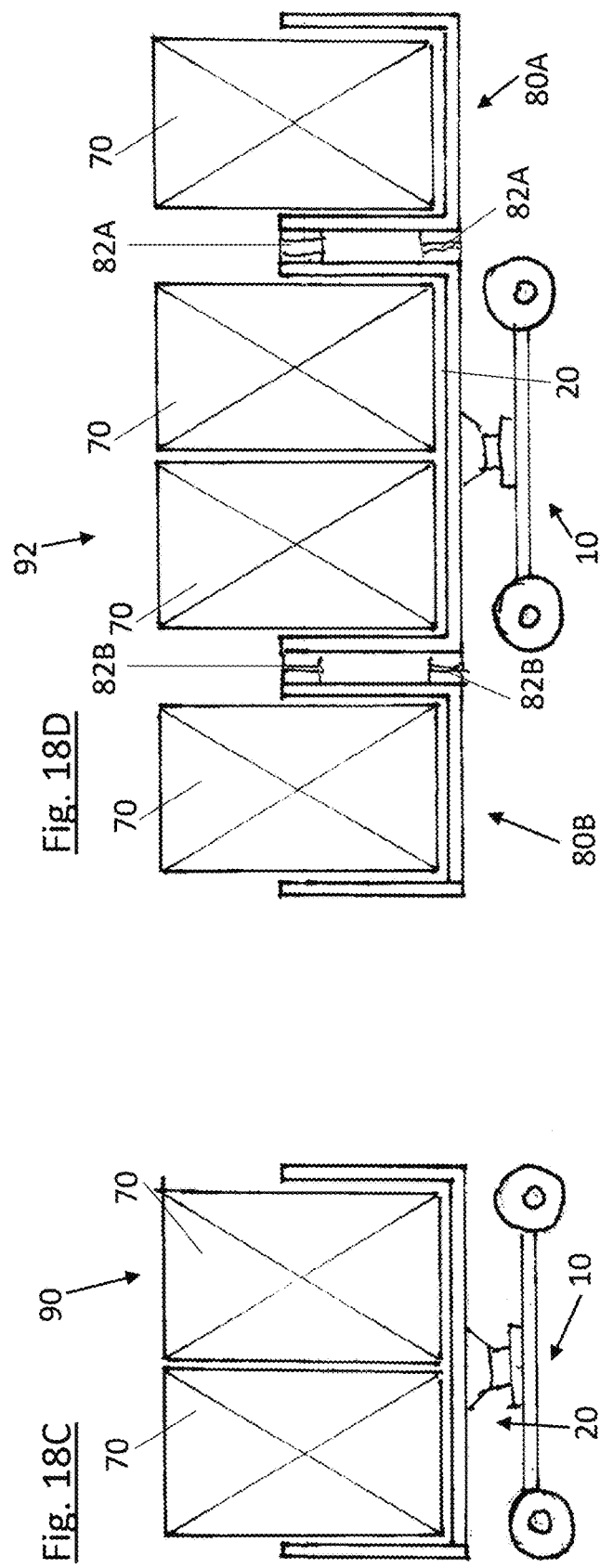

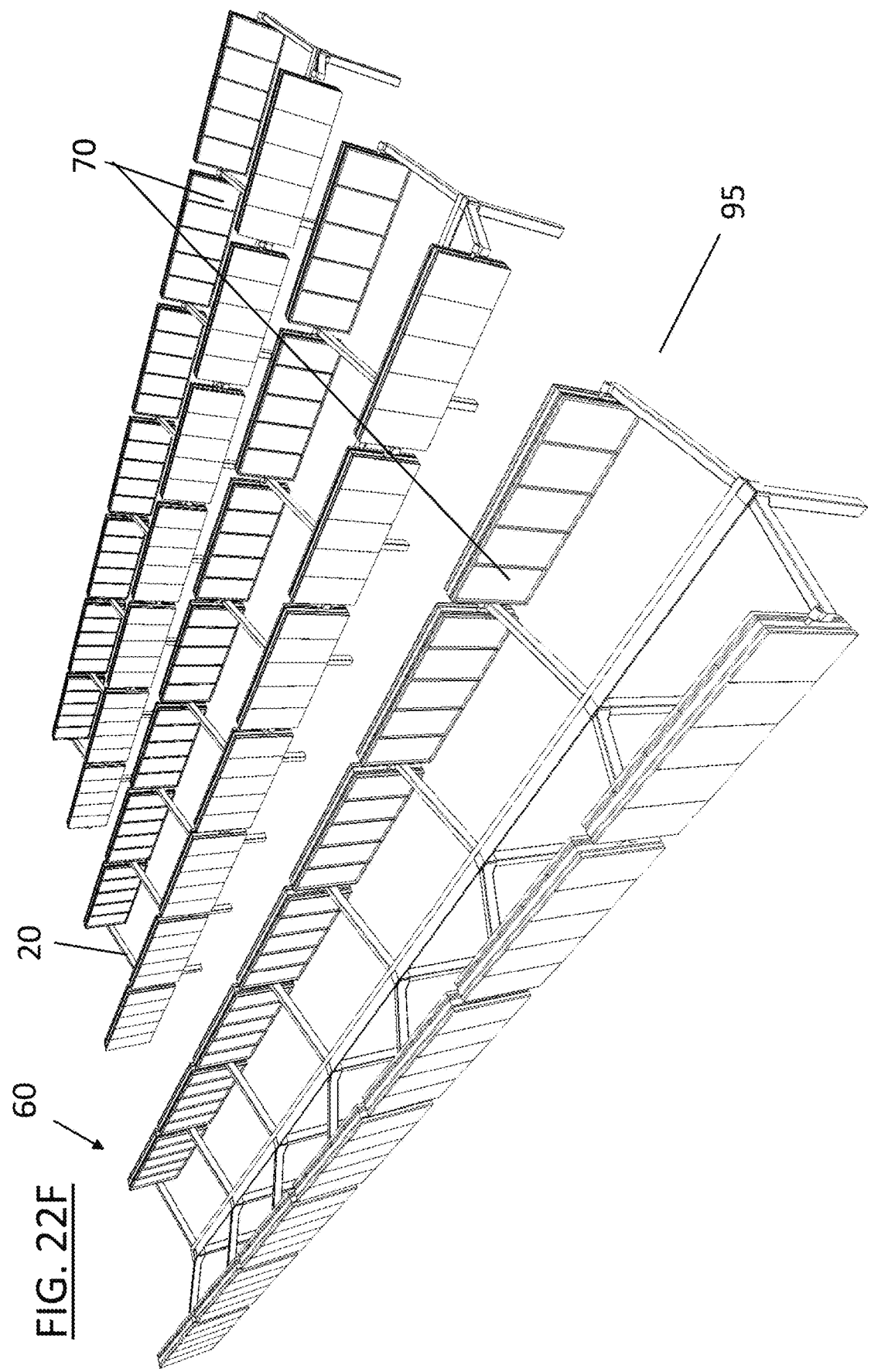

FOLDABLE SOLAR PANEL ASSEMBLY

CROSS-REFERENCE TO RELATED APPLICATIONS

This application is the National Stage of International Application No. PCT/EP2020/085580, filed Dec. 10, 2020, which claims the benefit of Netherlands Application No. 2024420, filed Dec. 10, 2019, the contents of which is incorporated by reference herein.

FIELD OF THE INVENTION

The invention relates to the field of solar energy generation and in particular to a foldable device for the support of solar panels in various situations.

BACKGROUND OF THE INVENTION

In the field of solar energy generation, the use of solar panels has become quite common on houses and in solar farms.

Solar farms have proven to be useful for the generation of electricity but do have a disadvantage. This disadvantage is that large area of land is required and that this land cannot be put to other use, only for limited purposes.

It has been researched to lay solar panels on dikes along the sea as they offer a large unused area, but because the composition and ground water level of dikes is vital to their function, it is often not possible to install regular solar panels in these areas. Covering up large areas of a dike would lead to local droughts and local wet spots because the panels prevent rain water from reach all areas of the dike. Because of this, dikes are generally not used to lay solar panels upon.

When solar panels are placed on the roof of a building, significant care is taken with respect to the orientation of the panels and the predominant wind direction. Also, the fixation to the roof is done with care for the panels not to detach at high wind speeds.

In colder climates, snow can also be an issue. Because the solar panels are oriented under a relatively small angle with respect to the horizontal, snow can build up on the panels. In the best case, this snow build up leads to a significant decrease in performance of the panel, ultimately blocking light from reaching the panel. In the worst case, the accumulated load from the snow build-up causes damage to the solar panel. The regular removal of snow from panels therefore is a necessity and is a costly, and potentially dangerous, operation.

A straightforward solution to the adverse weather would be to strengthen the connection of a solar panel to an underlaying structure such as a house, and to strengthen the solar panel itself. Although these solutions have been proven to work, the weight and cost of solar panels and their connection structure increases significantly. Also, a heavier construction also comes with an increased cost of installation.

Additionally, in a variety of climates hail storms are a common occurrence that has a large potential for damaging solar panels. Contrary to wind and snow, the problems that hail entails cannot be solved by strengthening the connection of the solar panels and the regularly cleaning of the solar panels.

Depending on the circumstances, an additional drawback of solar panels can be their static nature; once installed at a location they cannot easily be moved. EP3166221A1 discloses a system for the folding of a solar panel assembly and a mobile unit comprising such assemblies.

The solar panel assembly of EP3166221A1 comprises multiple solar panels wherein a first solar panel and a second solar panel are deployable from a respective first and second base position to a respective first and second deployment position. Herein, the first solar panel is at least partially deployed under the influence of gravity and the second solar panel is connected to the first solar panel via a mechanism that transforms the gravitational force into a deployment force assisting the deployment of the second solar panel.

Multiple of these assemblies can then by combined and fixed to a frame of a mobile unit configured to transport the assemblies to a location where they can be deployed.

A drawback of EP3166221A1 is that the assembly introduces various moment loads in its base because during the unfolding process all panels are located on one side of the base and in the unfolded state, two panels are located on one side of the base and only one panel is located on an opposite side of the base. Also, the base must be capable of supporting the assembly with a centre of gravity that is located far away from the base when the solar panels have been deployed.

Additionally, to deploy the solar panels, the centre of gravity of the second panel must first move upwards together with the centre of gravity of the first panel. This requires a significant effort before the first gravitational force assist the deployment of the second solar panel.

OBJECT OF THE INVENTION

It is an object of the invention to make solar panels less vulnerable to adverse weather conditions allowing installation of solar panels in unprotected areas.

It is a further object of the invention to provide a system that allows solar panel installation on dikes.

It is a further object of the invention to provide a system that can deliver basic power supply to rural areas, specifically in developing countries.

It is a further object of the invention to provide a solar panel system that allows more or better use of the land area under the solar panels.

It is a further object of the invention to provide a system that is suited for the use of solar panels on bodies of water, in particular on large open bodies of water, and more in particular on seas and oceans.

It is an even further object of the invention to provide a system that is weatherproof and able to withstand elevated wind speeds, large amounts of snowfall, and hail storms.

It is an even further object of the invention to provide a system that can be moved from a compact state to an expanded, operational state.

It is an even further object of the invention to provide a system that is easily storable and transportable to shelter it from adverse conditions such as vandalism.

It is an even further object of the invention to provide a system that can regulate environmental conditions of land located underneath it.

It is a yet another object of the invention to provide an improved method for folding and/or unfolding a foldable solar panel assembly.

SUMMARY OF THE INVENTION

The invention relates to a foldable solar panel assembly according to as described herein. The foldable solar panel assembly is foldable between a folded, undeployed position and an unfolded, deployed position.

The undeployed position of the foldable solar panel assembly forms a compact package of solar panels that, due to its compact size, is under less influence of wind than an unfolded solar panel.

The foldable solar panel assembly comprises a base that can be fixed to the ground and to which a frame is connected. In some embodiments, the connection between the frame and the base may be a rotational connection about the vertical axis that can be fixed, free, and can also be actuated. Through the free, or actuated connection, the foldable solar panel assembly can be oriented so that is has a minimal surface area normal to the direction of the wind.

In the case of the free rotation, the solar panels may be placed out of centre with respect to the rotational connection so that the solar panels can act as a wind vane.

In the case of the actuated rotation, a sensor that is connected to the foldable solar panel assembly can be used to measure the wind direction and wind speed. The measurement data can then be used to adjust the orientation of the frame with respect to the base so that the solar panels do not catch too much wind. The actuation can also be disengaged to reinstate the free rotation.

Sensors can also be used to determine whether the wind speed becomes too high for the safe operation of the foldable solar panel assembly in a deployed position and can therefore be used to determine if it necessary to fold the foldable solar panel assembly into the undeployed position.

Additionally, an actuated connection can be used to orient the solar panels with respect to the sun. Because the earth rotates around the sun, the position of the sun with respect to the solar panels changes constantly. This changes in relative position can also be measured using sensors.

In one embodiment, the connection of the frame to the base can also comprise a rotational connection about the horizontal axis. This connection is actuated and can be used to follow the sun even better than with the rotation about the vertical axis.

In another embodiment, the base is not fixed to the ground but to a floating device. In this embodiment, the connection of the frame to the base is fixed because the floating device can freely rotate about a vertical axis.

Additionally, the floating device can comprise propulsive means that can be used to orient the floating device with respect to the sun and to the wind. The position of the sun, the wind speed, and the wind direction can be measured with sensors, and the measurement data can be used as input for the propulsion of the floating device.

The floating device can be a regular vessel such as a boat, but it can also be a floating device such as a semi-submersible platform or a pontoon. The floating device may also comprise a submersed lower part providing the buoyancy to keep the foldable solar panel assembly above the water, wherein the lower part is affected less by surface waves.

In one embodiment, the frame comprises two upwardly extending posts that are located in the same plane at a horizontal distance from each other. When facing the front of the frame, a first post is located on the left side of the frame, and a second post is located on the right side of the plane. To each post an articulated support arm is connected via an arm mount.

Each articulated supports arm comprises:
 a forward arm part which when seen in side view in the deployed position extends forward from the at least one upwardly extending post and
 a rearward arm part which when seen in side view extends rearwards from the at least one upwardly extending post, Each articulate support arm mechanism comprises a plurality of segments and a plurality of hinge devices interconnecting the segments, each hinge device having one or more hinge axes about which the articulated support arm mechanism folds.

The segments and the hinge devices are constructed to couple the rotations of the segments to one another during folding and unfolding in that, when a first segment rotates, a second segment which is connected via a hinge device to the first segment is forced to rotate relative to the first segment.

In an embodiment, all segments rotate simultaneously.

In an embodiment, all segments arrive in an undeployed position simultaneously.

Herein, each segment supports at least one solar panel which extends away from said segment over a horizontal distance and the hinge axes are oriented in a substantially horizontal direction.

In an undeployed position, the segments of the articulated support arm mechanism are oriented in a substantially vertical position. Due to this vertical orientation, no large amounts of snow can build-up on the solar panels, the solar panels do not cast a shadow over the underlying land or hinder rain from reaching the underlying land, and the solar panels are not exposed to adverse weather conditions such as hail. The axes about which the rotation of the panels occur as a result of the folding motion are in a substantial horizontal direction.

The left articulated support arm mechanism, as seen from the front of the foldable solar panel assembly can be connected to the right articulated support arm mechanism in the horizontal direction via a crossmember.

To move between a folded, undeployed position and an unfolded, deployed position, the foldable solar panel assembly comprises a drive system.

In one embodiment, this drive system is connected to one articulated support arm mechanism and actuates the folding behaviour by rotating the one articulated support arm mechanism.

In another embodiment, the drive system is connected to all articulated support arm mechanisms and actuates the folding behaviour by rotating all articulated support arm mechanisms.

It is evident that other numbers of upwardly extending posts and articulated support arm mechanisms are possible. In another possible embodiment, the frame comprises one upwardly extending post to which one articulated support arm mechanism is connected via an arm mount.

In another embodiment, the frame comprises one upwardly extending post to which two articulated support arm mechanisms are connected via two arm mounts.

Another possible embodiment comprises arm mounts, to which the articulated support arm mechanisms are connected, that extend over a horizontal distance extending away from the upwardly extending posts. Herein, at least one arm mount extends towards the front of the foldable solar panel assembly, and at least one arm mount extends towards the back of the Foldable solar panel assembly. The arm mounts extending in different direction can be located at different elevations.

In a deployed position, the forward arm part extends diagonally downwards to the front of the foldable solar panel assembly and the rearward arm part extends diagonally upwards to the back of the frame.

The forward arm part can be connected to either the arm mount extending towards the front or to the arm mount extending towards the back.

The rearward arm part can be connected to either the arm mount extending towards the front or to the arm mount extending towards the back.

A drive system that is configured to actuate the folding behaviour of the articulated support arm mechanisms may comprise a connection between the forward and rearward arm parts. Additionally, the drive system actuates at least one rearward or forward arm part through which the entire foldable solar panel assembly is folded or unfolded.

The connection of the drive system can be a wire that is connected to the forward arm part and rearward arm part. The forward and rearward arm parts are connected to the same upwardly extending post. This post extends above the articulated support arm mechanisms in the undeployed position and comprises a pulley located at its upper end. The wire passes over the pulley and is engaged by a motor that is connected to the frame. This motor can pull the wire in both an upward and a downward direction. The pulling of the wire folds and unfolds the articulated support arm mechanism.

Additionally, the wire can be connected to the articulated support arm mechanisms via a straight guide that is connected to an articulated support arm mechanism and to a post.

Another embodiment of the drive system comprises sets of teeth connected to the forward and rearward arm parts. These sets of teeth can be coupled by a coupling means such as a chain or a set of gears, and are actuated by a motor.

In one embodiment, the forward and rearward arm parts comprise two outer arms and a plurality of segments. The segments are denoted by numbers and are configured to support one or more solar panels. The numbering starts at the segment connected to the arm mount and increases with each segment.

In an embodiment, the position of the centre of gravity of the foldable solar panel assembly does not change. The forward and downwards motion of the forward arm part is equal to the backwards and upwards motion of the rearward arm part.

In one embodiment of the foldable solar panel assembly, each articulated support arm mechanism comprises two outer arms, wherein each segment, except the forward and rearward outer segments, comprises a four-bar linkage.

In an embodiment, each four-bar linkage may comprise:
a ground link,
an input link that is hinged to the ground link and comprises means for the rotational coupling to another link at least at an extremity away from the ground link, and in particular at both extremities,
an output link that is pivotably connected to the ground link, and
a connecting link that is pivotably connected to the input and output link,
the forward and rearward outer segments comprise means for the rotational coupling to an input link of a four-bar linkage at one extremity,
wherein, in the first segment,
either the ground link is rigidly connected to the at least one arm mount, or
the input link and output link are rotatably connected to the arm mounts, and
wherein in a second segment the ground link is connected to the connecting link of a first segment under an angle between 0 and 90 degrees, and,
wherein, in this connection, the extremities of the input links of a first and a second segment are spaced at a distance suitable for the coupling means of both input links to engage, and
wherein the connecting link of the last four-bar linkage comprises an additional hinge point configured to accommodate an extremity of the forward or rearward outer segment that is spaced at a distance for the coupling means of the input link and the forward or rearward outer segment to engage.

In one embodiment, the forward and rearward arm parts are oriented 2-fold rotationally symmetric with respect to a point positioned on the upwardly extending posts.

In another embodiment, the forward and rearward arm parts are connected to each other to form a balance.

In one embodiment, during the unfolding, the odd numbered segments of the articulated support arm mechanism rotate clockwise and the even numbered segments rotate counter-clockwise, and during the folding the rotation is in the opposed direction to that during the unfolding.

In another embodiment, during the folding, the odd numbered segments of the articulated support arm mechanism rotate clockwise and the even numbered segments rotate counter-clockwise, and during the folding the rotation is in the opposed direction to that during the unfolding.

In an embodiment, the articulated support arm mechanism comprises at least three segments, in particular 5 segments and wherein in particular one segment is positioned centrally and extends on either side of the frame.

In the undeployed position, the odd-numbered segments of the forward arm part are oriented significantly downward and the even segments are oriented significantly upward and the odd-numbered segments of the rearward arm part are oriented significantly upward and the even segments are oriented significantly downward.

In another embodiment, the odd-numbered segments of the forward arm part are oriented significantly upward and the even segments are oriented significantly downward, and the odd-numbered segments of the rearward arm part are oriented significantly downward and the even segments are oriented significantly upward.

In the deployed position, the segments and outer arms that are connected to each other can be oriented at an angle with respect to each other. The angle between a segment and the subsequent segment lies between 170-190 degrees. In particular, the angle between each segment and a subsequent segment is 180 degrees, more in particular, all segments lie in the same plane.

In the deployed position, the articulated support arm mechanisms are oriented at an angle relative to the upwardly extending posts and this angle lies in the rage of 0 to 90

In order to clear the articulated support arm mechanisms during the folding motion and in the undeployed position, the solar panels can be connected to the support arms via a connecting piece that defines a gap for the articulated support arm mechanism to pass through.

To optimise the amount of generated energy, the solar panel connected to the articulated support arm mechanisms may comprises cut-outs that substantially match the gap defined by the connecting piece. This way, the maximum amount of surface area can be obtained without hindering the workings of the Foldable solar panel assembly.

In other for people, animals, and vehicles not to be hindered by the foldable solar panel assembly, a minimum height is be necessary. In one embodiment, the lower end of a deployed articulated support arm mechanism is located at least two meter above ground level, in particular three meter from the ground.

In an embodiment, the frame comprises a frame hinge having a horizontal rotation axis with respect to the base or the at least one articulated support arm mechanism is connected to the frame by a rotational connector which allows rotation of the at least one articulated support arm mechanism relative to the frame about the horizontal axis. This allows the orientation of the panels towards the sun resulting in a higher amount of power that can be produced.

In an embodiment, the frame hinge or the rotational connector is connected to a rotation actuator configured to actuate a rotation of the frame or the articulated support arm mechanism about the horizontal rotation axis.

In one embodiment, the foldable solar panel assembly also comprises one or more locking mechanisms to lock the articulated support arm mechanisms in the folded position and in the unfolded position.

In one embodiment wherein the foldable solar panel assembly is equipped with one or more sensors, the measurement data is used as input data for a control unit that controls the orientation of the panels through the actuation of the rotation of the articulated support arm mechanisms about a vertical and a horizontal axis. It may also be used as input data for the actuation of the rotation of the frame about the horizontal axis.

The measurement data can also be used to control the drive system that actuates the folding and unfolding of the articulated support arm mechanisms. Additionally, it can also be used to control the engagement of the actuation of the rotation about the vertical axis of the frame with respect to the base.

The control unit can comprise software that allows it to operate autonomously. It can also comprise communication means to be controlled from a remote position away from the control unit. When controlled from a remote position away from the control unit, instructions may also be provided autonomously, for example by an algorithm.

In an embodiment, measurement data may also be acquired at a remote location and be sent to the control unit of the foldable solar panel assembly.

In one embodiment, the foldable solar panel assembly is connected to a trailer that is configured to be mounted to a car. In this configuration, a mobile electricity plant is created that is moveable between any position where power could be useful.

In an embodiment, the foldable solar panel assembly is directly connected to a vehicle, in particular to agricultural machinery, Energy that is harvested by the foldable solar panel assembly may be used to at least partially power the agricultural machinery.

In an embodiment, the foldable solar panel assembly may be directly connected to a ship or yacht.

In another embodiment, the foldable solar panel assembly is configured to be lifted by a lifting device, in particular by a forklift, to be moved around. This also result in a mobile electricity solution that can be used where necessary.

In an embodiment, the foldable solar panel assembly further comprises at least one moveable outrigger, wherein the at least one outrigger is moveable between a retracted position and a deployed position. In the deployed position an outer end of the at least one moveable outrigger is located at an outrigger distance of the centre of gravity of the foldable solar panel assembly.

In an embodiment, the foldable solar panel assembly further comprises a battery housing located on the lower side of the base, wherein the battery housing is defined by a battery length and battery width and is configured to accommodate a battery. A power supply system may also be provided, wherein the power supply system comprises power electronics and is configured to connect an electrical device to the battery.

In another embodiment, the base is fixed to the ground and the Foldable solar panel assembly is used as a permanent power solution. Multiple foldable solar panel assemblies can be positioned next to each other to form large rows and can be used at the scale of solar farms.

In an embodiment, the foldable solar panel assembly further comprises at least one side panel assembly, wherein the side panel assembly is hingedly connected to the frame or to the base via a hinge, the side panel assembly extends away from the hinge in at least a horizontal direction. Herein, the at least one side panel assembly comprises at least one articulated support arm mechanism and the at least one side panel assembly is moveable between a compact state and a deployed state.

By hingedly connecting a side panel assembly to the base or to the frame, more solar panels can be used in a deployed state while the compact state occupies a space of limited dimensions.

In an embodiment, when seen in front view a first number of side panel assemblies is connected to the frame on a left side of the frame and a second number of side panel assemblies is connected to the frame on a right side of the frame, in particular the number being one.

In an embodiment, in the deployed state and/or the compact state the hinge axes of each articulated support arm mechanism are substantially parallel and/or the solar panels of each articulated support arm mechanism are substantially co-planar.

In an embodiment, when viewed in top view, in the compact state a right end of a first side panel assembly is connected by a hinge to a right side of the frame and a left end of a second side panel assembly is connected by a hinge to a left side of the frame, or vice versa. Herein, at least one solar panel supported by the first side panel assembly is located in front of at least one solar panel supported by the frame and at least one solar panel supported by the second side panel assembly is located behind the at least one solar panel supported by the frame.

In another embodiment, when viewed in top view, in the compact state a right end of a first side panel assembly is connected by a hinge to a right side of the frame and a left end of a second side panel assembly is connected by a hinge to a left side of the frame. Herein, at least one solar panel supported by the side panel assembly is located in front of at least one solar panel supported by the frame and at least one solar panel supported by the second side panel assembly is located in front of the at least one solar panel support by the frame.

In an embodiment, in the compact state, backsides of outermost solar panels and/or backsides of the at least one solar panel supported by the frame face outwards and front sides of outermost solar panels face inwards.

By positioning the side panel assemblies and corresponding solar panels in a way wherein the backsides of the solar panels face outwards and the front sides face inwards, the delicate photovoltaic surface located on the front side remains protected from external factors such as hail, vandalism, etc.

In an embodiment, the first side panel assembly has a first width and the second side panel assembly has a second width, wherein the sum of the first width and the second width is substantially the same as a middle width of the frame, and in particular the first width is substantially equal to the second width.

In use, a foldable solar panel assembly according to the present invention may be folded and/or unfolded, between a compact and folded, undeployed position and an unfolded, deployed position. The method for folding and/or unfolding comprises applying a moment with the drive system to a segment of at least one articulated support arm mechanism of the foldable solar panel assembly according to the present invention. Herein, the segments and the hinge devices couple the rotations of the segments to one another, in that, when a first segment rotates, a second segment which is connected via a hinge device to the first segment is forced to rotate relative to the first segment. Herein, each segment supports at least one solar panel which extends away from said segment over a horizontal distance and said hinge axes are oriented in a substantially horizontal direction.

In an embodiment, during folding and unfolding of the foldable solar panel, a position of a centre of gravity of the combination of all the articulated support arm mechanisms does not substantially change.

In an embodiment, in side view, during the unfolding odd numbered segments of the articulated support arm mechanism rotate clockwise and even numbered segments rotate counter-clockwise, and during the folding the rotation of each segment is in the opposed direction to that during the unfolding. Alternatively, during the folding the odd numbered segments of the articulated support arm mechanism rotate clockwise and the even numbered segments rotate counter-clockwise, and during the folding the rotation is in the opposed direction to that during the unfolding.

In an embodiment, the frame comprises a frame hinge having a horizontal rotation axis with respect to the base or wherein the at least one articulated support arm mechanism is connected to the frame by a rotational connection about the horizontal axis. Herein, the method comprises the step of rotating the frame or the at least one articulated support arm mechanism about a horizontal axis.

In an embodiment, the foldable solar panel assembly comprises at least one sensor to measure the position of the sun with respect to the foldable solar panel assembly and/or at least one sensor to measure the direction of the wind with respect to the foldable solar panel assembly and/or a sensor to measure the wind speed with respect to the foldable solar panel assembly. Herein, the method comprises the step of measuring the position of the sun, the direction of the wind, and/or the wind speed.

In an embodiment, the foldable solar panel assembly is deployed and undeployed to allow or prevent rain and/or sunshine to reach land located beneath the foldable solar panel assembly. Herein, the folding behaviour is used to control environmental conditions of the land located beneath the foldable solar panel assembly. The foldable solar panel assembly may further comprise a gutter and rain that falls on the solar panels is collected in said gutter.

In an embodiment, the method for deploying a foldable solar panel assembly according to the present invention, comprises the steps:
a) moving the side panel assemblies from the compact state to the deployed state,
b) unfolding the at least one articulated support arm mechanism.

In an embodiment, when viewed in top view, in the compact state a right end of a first side panel assembly is connected by a hinge to a right side of the frame and a left end of a second side panel assembly is connected by a hinge to a left side of the frame. Herein, at least one solar panel supported by the first side panel assembly is located in front of at least one solar panel supported by the frame and at least one solar panel supported by the second side panel assembly is located behind the at least one solar panel supported by the frame. During step a) the first side panel assembly initially located in front of at least one solar panel supported by the frame is rotated clockwise and a second side panel assembly initially located behind at least one solar panel supported by the frame is rotated clockwise to the deployed state.

Alternatively, when viewed in top view, in the compact state a left end of a first side panel assembly is connected by a hinge to a left side of the frame and a right end of a second side panel assembly is connected by a hinge to a right side of the frame. Herein, at least one solar panel supported by the first side panel assembly is located in front of at least one solar panel supported by the frame and at least one solar panel supported by the second side panel assembly is located behind the at least one solar panel supported by the frame. During step a) the first side panel assembly initially located in front of at least one solar panel supported by the frame is rotated clockwise and a second side panel assembly initially located behind at least one solar panel supported by the frame is rotated counter-clockwise to the deployed state.

In an embodiment, when viewed in top view, wherein during step a) the first side panel assembly is rotated clockwise and the second side panel assembly is rotated counter-clockwise.

BRIEF DESCRIPTION OF THE DRAWINGS

FIG. 12 shows a cross-sectional view of a hinge device

FIG. 13 shows an isometric view of another embodiment of the invention in the deployed position.

FIG. 14 shows an isometric view of an embodiment of the invention between the deployed and undeployed position.

FIG. 15 shows an isometric view of an embodiment of the invention in the undeployed position.

FIGS. 17A-17E show an embodiment of the invention comprising side panel assemblies.

FIGS. 18A-18E show another embodiment of the invention comprising side panel assemblies.

FIG. 22A-22F show an embodiment wherein the invention is used to regulate the environmental conditions of the land located beneath the invention.

DETAILED DESCRIPTION OF THE INVENTION

Figure 1:
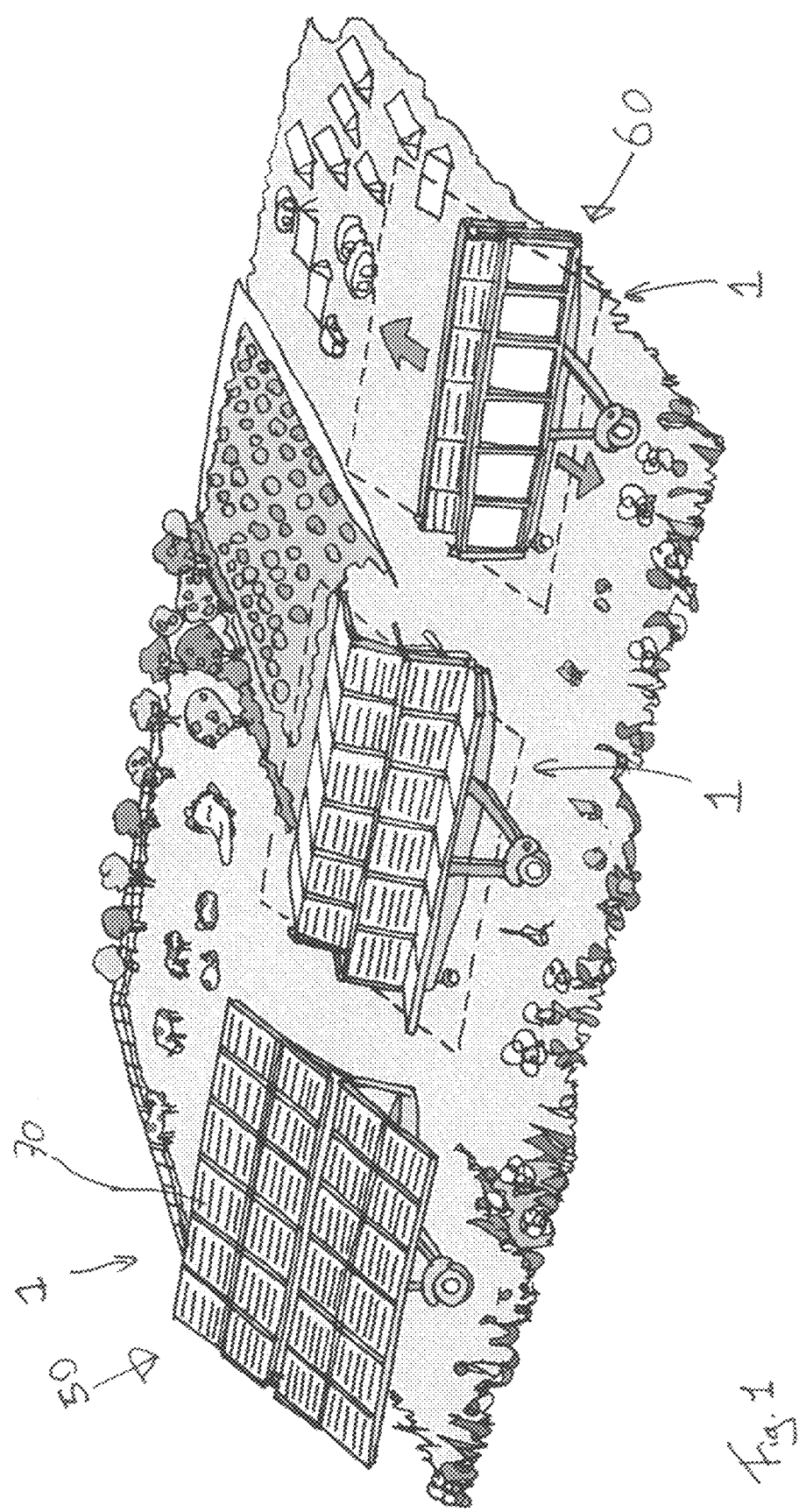
FIG. 1 shows the general workings of a small embodiment of the invention.
Figure 2:
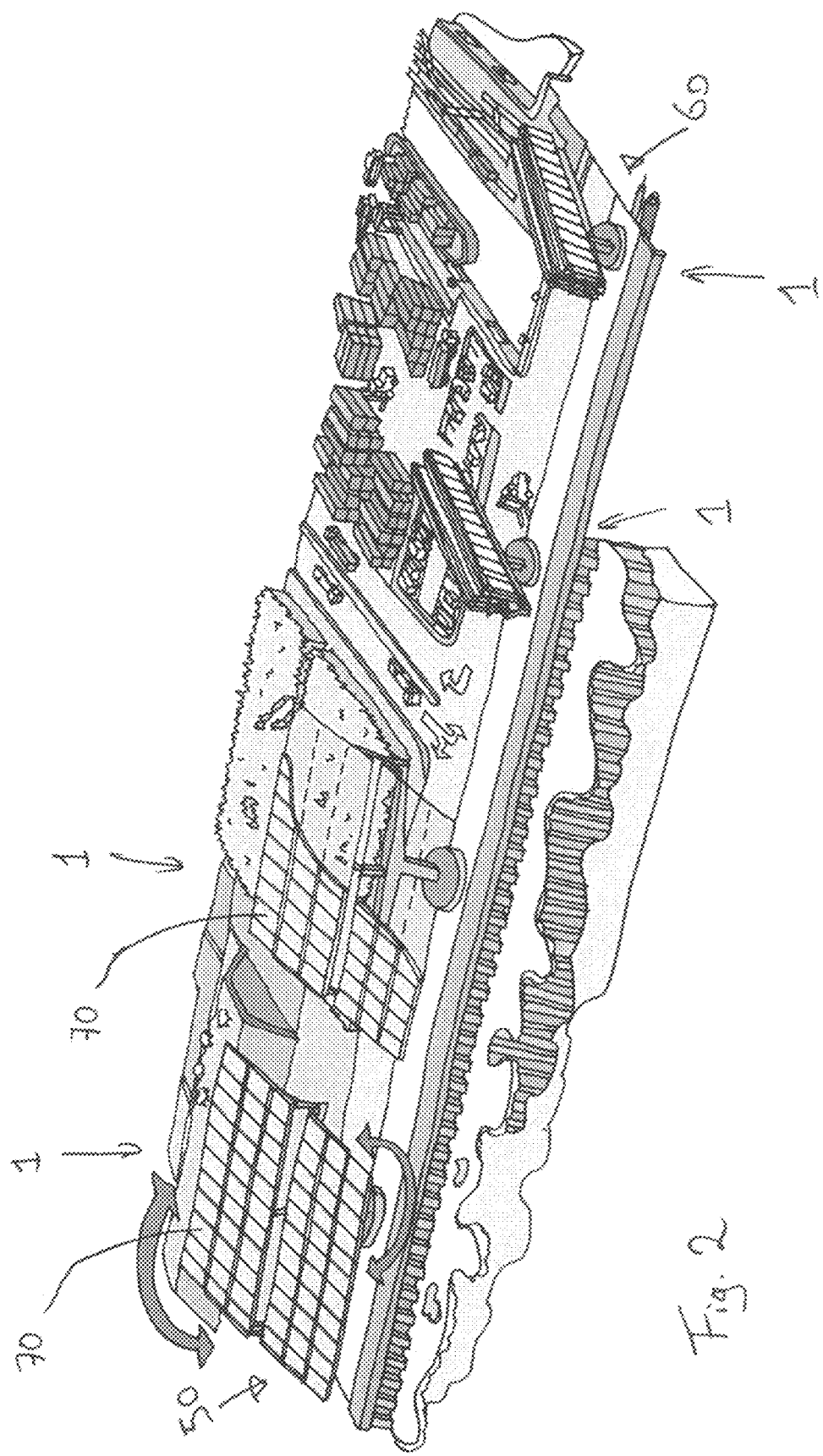
FIG. 2 shows the general workings of a larger embodiment of the invention.
Figure 3:
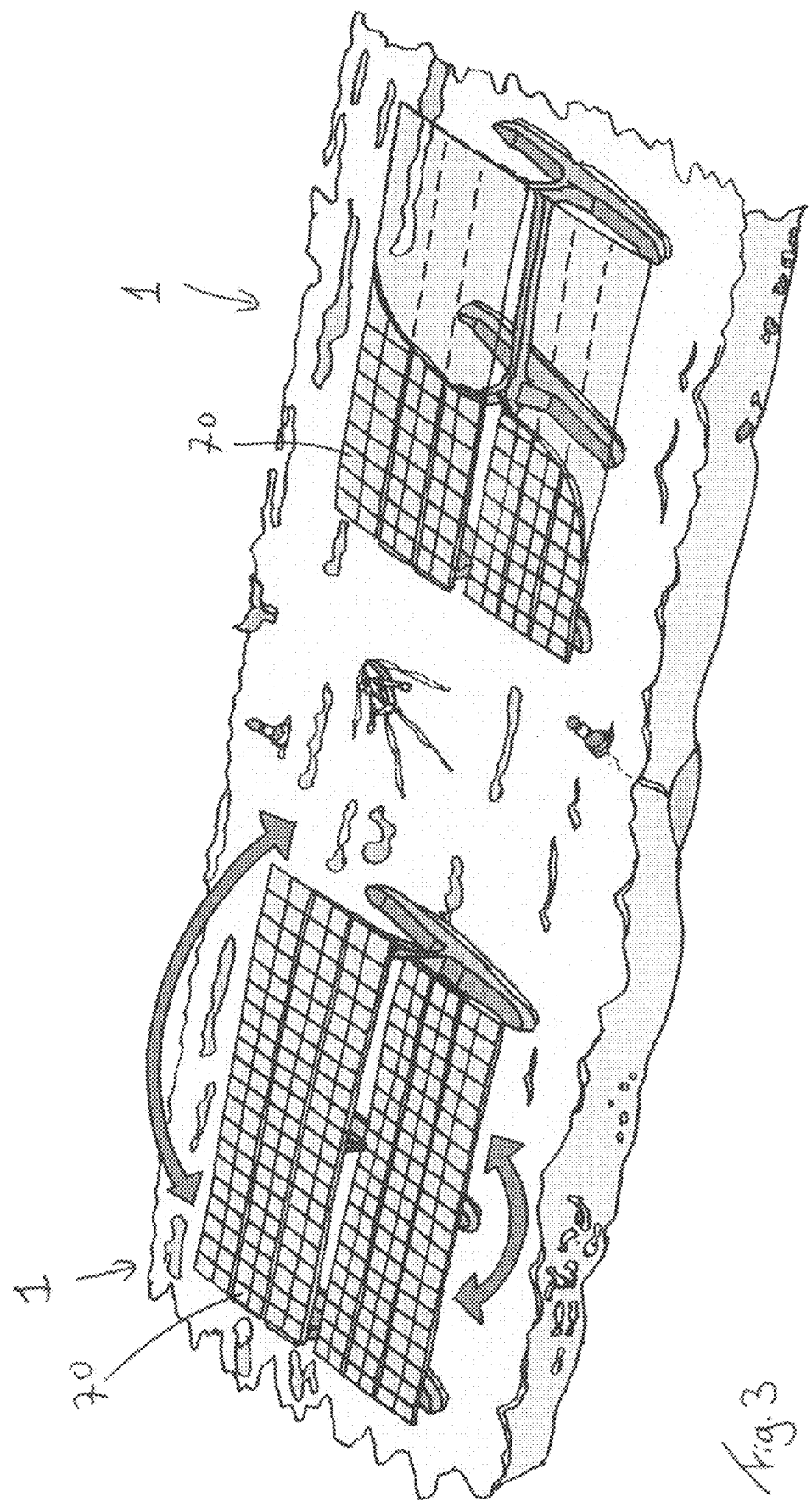
FIG. 3 shows the general workings of a large embodiment of the invention.

As an introduction, the general workings and possible applications of the foldable solar panel assembly are shown in FIGS. 1, 2, and 3.

In FIG. 1, three foldable solar panel assemblies 1 are shown. From left to right, the foldable solar panel assemblies 1 are shown in the deployed, unfolded position 50, in an intermediate position during the folding movement, and in an undeployed, folded position 60.

In FIG. 2, four foldable solar panel assemblies 1 are shown, of which, from left to right, two are in the deployed position 50 and two are in the undeployed position 60. The outer left depiction shows 2 arrows that indicate the rotation that the foldable solar panel assembly can perform. This rotation can be used to follow the sun to orient the solar panels 2 with respect to the sun to generate as much electricity as possible.

The second assembly from the left shown in FIG. 2 represents how the deployed position allows for the generation of electricity and how the undeployed position doesnt hinder the use of agricultural land or dikes or hinders this less. The "see through" portion of the foldable solar panel assembly represents the folded position wherein free access to the underlying agricultural land or dikes is provided for rain and sun.

FIG. 3 depicts another situation wherein the foldable solar panel assembly can be used. On the left of figure three the free or propelled rotation of the foldable solar panel assembly is represented by the arrows. This rotation can be used to follow the sun around or to position the foldable solar panel assembly so that is under less influence of the wind.

Figure 4:
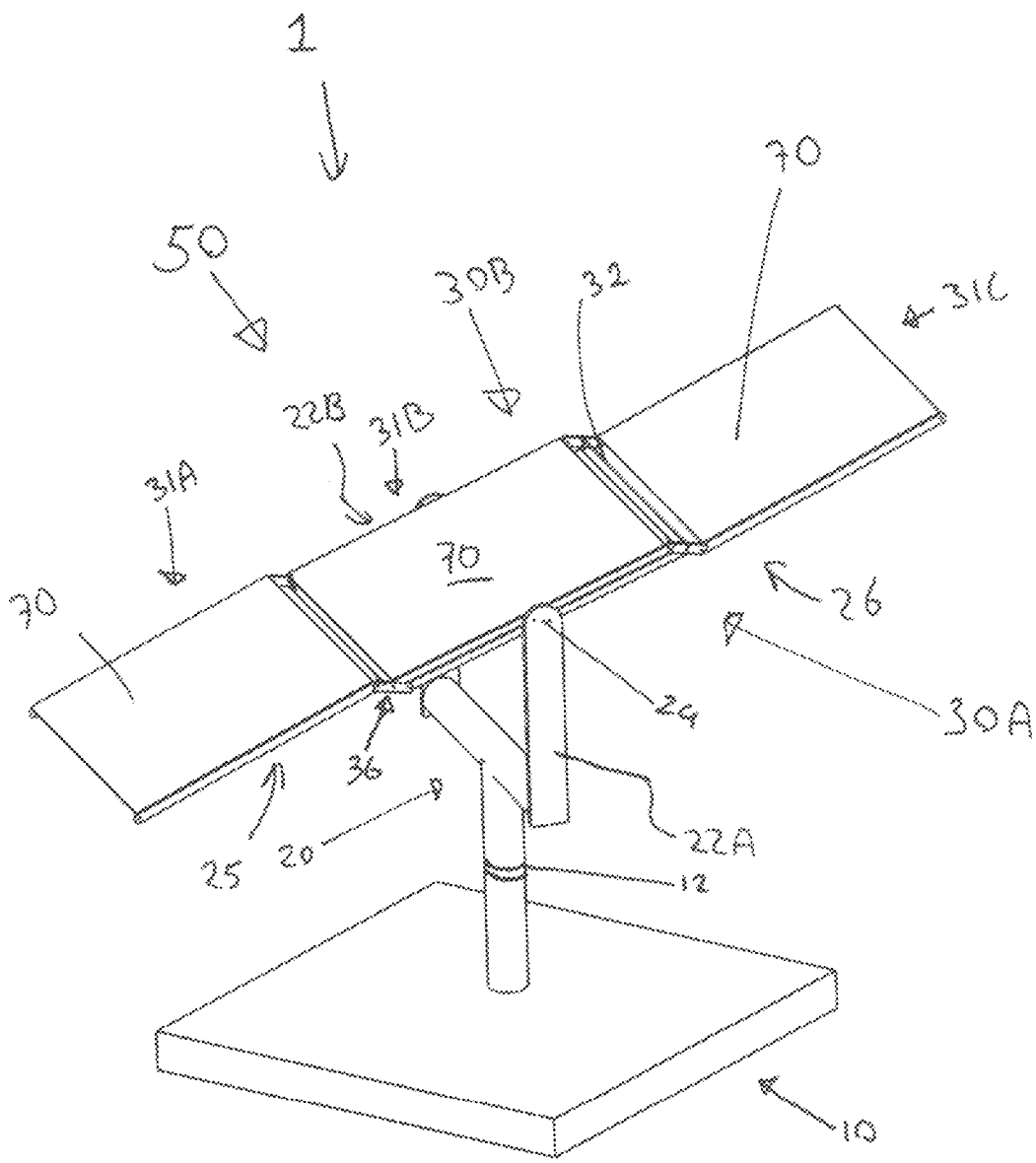
FIG. 4 shows an isometric view of an embodiment of the invention in the deployed position.

Turning to FIG. 4, an embodiment of the foldable solar panel assembly 1 is shown wherein a frame 20 is connected to a base 10 via a rotational connection 12. This connection can be free or can be actuated. In the case for which the rotation is free, the frame can be positioned off-centre with respect to the base so that the solar panels can act as a wind vane. It is noted that the foldable solar panel assembly 1 may be considerably wider than as shown in the FIGS. 4-11. In FIG. 4 the foldable solar panel assembly 1 is in the unfolded deployed position. In the deployed position, the segments 31 that are connected to each other are oriented at an angle of 170-190 degrees with respect to each other, in particular 175-185 degrees, more in particular extend parallel (180 degrees) or substantially parallel.

The frame 20 comprises two upwardly extending posts 22 that are spaced at a horizontal distance from each other. In front view, a first post 22B is located on the left of the frame and a second 22A post is located on the right of the frame. An articulated support arm mechanism 30 is connected to a post 22 via an arm mount 24. The articulated support arm mechanism 30 comprises a forward arm part 25 which, when seen in side view, extends forward from the post 22, and a rearward arm part 26 which, when seen in side view, extends rearward from the post 22. The articulated support arm mechanism 30 is configured to support one or more solar panels 70. This embodiment comprises two articulated support arm mechanisms 30, one denoted as 30A on the right and one denoted as 30B on the left, when seen in front view.

Also, each articulated support arm mechanism 30A, 30B comprises three segments 31A, 31B, and 31C that are interconnected via hinge devices 36. The hinge devices 36 are constructed to couple the rotations of the segments to one another during folding and unfolding in that, when a first segment 31B rotates, a second segment 31A or 31C which is connected via a hinge device 36 to the first segment 31B is forced to rotate relative to the first segment.

Parallel to the hinge axes, a cross member 32 is shown that connects the articulated support arm mechanism 30B on the left to the support arm mechanism 30A on the right.

Figure 5:
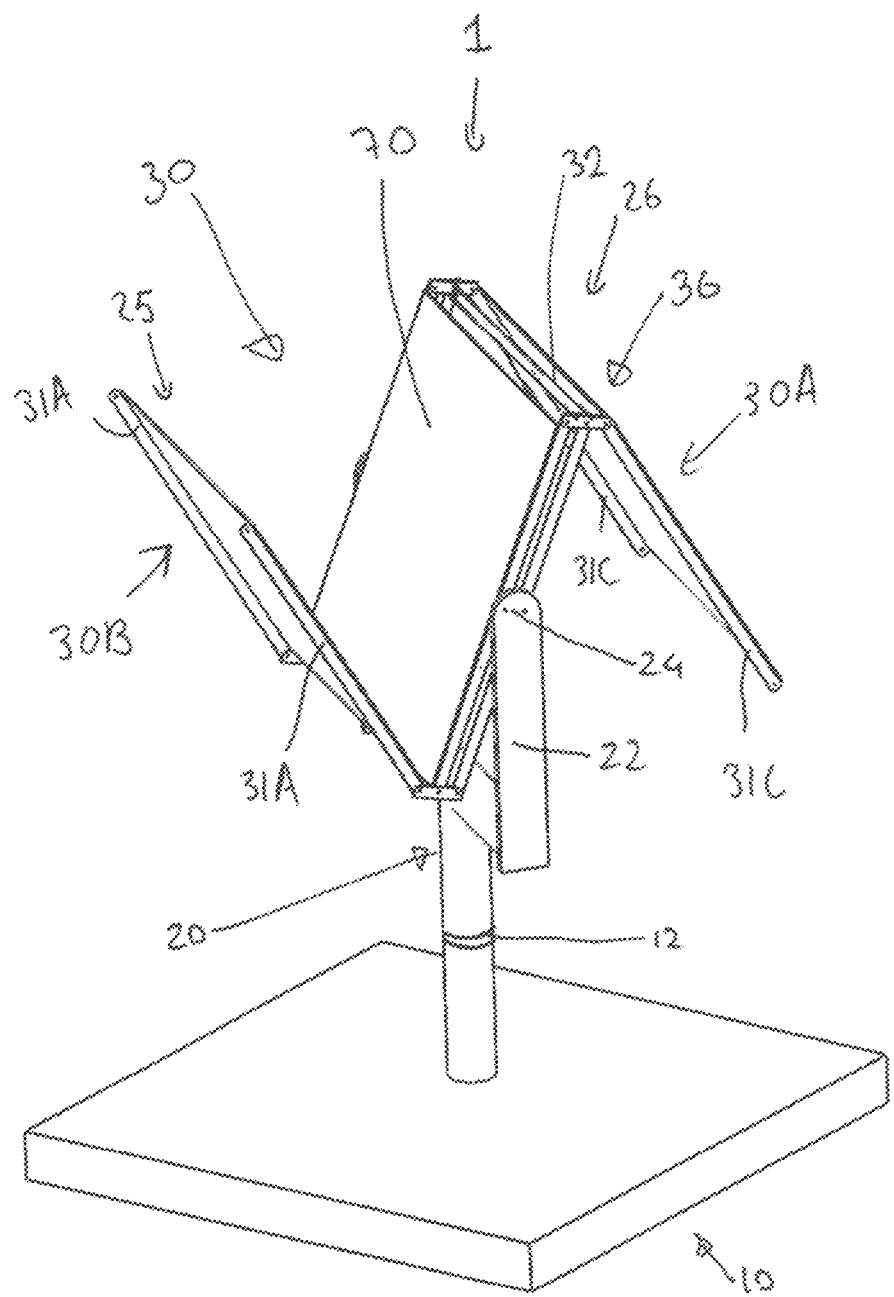
FIG. 5 shows an isometric view of an embodiment of the invention between the deployed and undeployed position.

Turning to FIG. 5, the same embodiment as shown in FIG. 4 is depicted in an intermediate position between the deployed, unfolded position 50 and the undeployed, folded position 60

Figure 6:
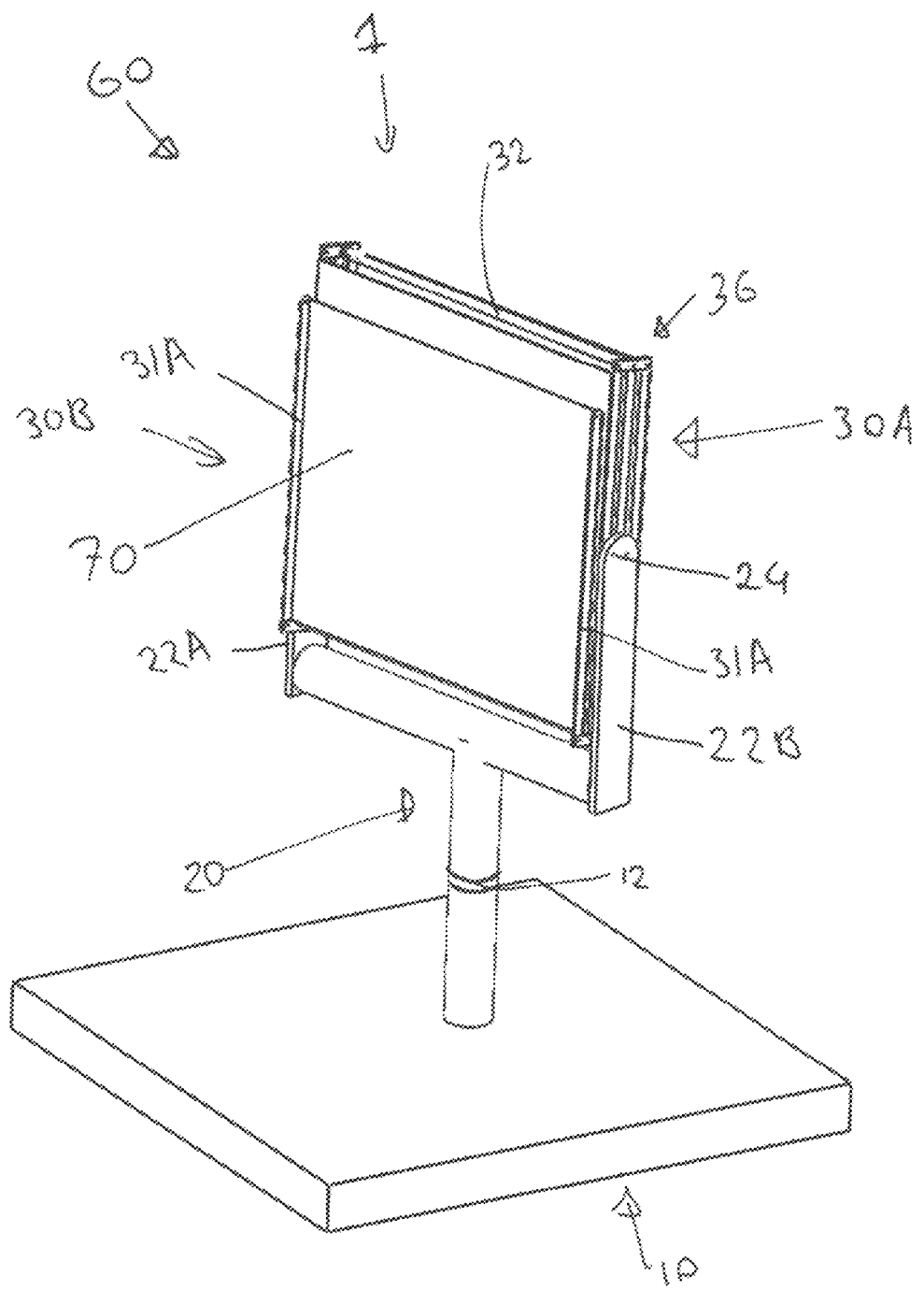
FIG. 6 shows an isometric view of an embodiment of the invention in the undeployed position.

Turning to FIG. 6, the same embodiment as shown in FIGS. 4 and 5 is shown, depicted in the undeployed, folded position.

Turning to FIGS. 7 to 11, another embodiment is shown where the forward arm part 25 of each articulated support arm mechanisms 30A and 30B is separate from the rearward arm part 26. The forward arm part 25 of each articulated support arm mechanisms 30A and 30B comprises three segments 31 and the rearward arm part 26 of each articulated support arm mechanisms 30A and 30B comprises three segments 31. The segments 31 which are closest to the post do not support a solar panel. Hence there are four solar panels.

Figure 7:
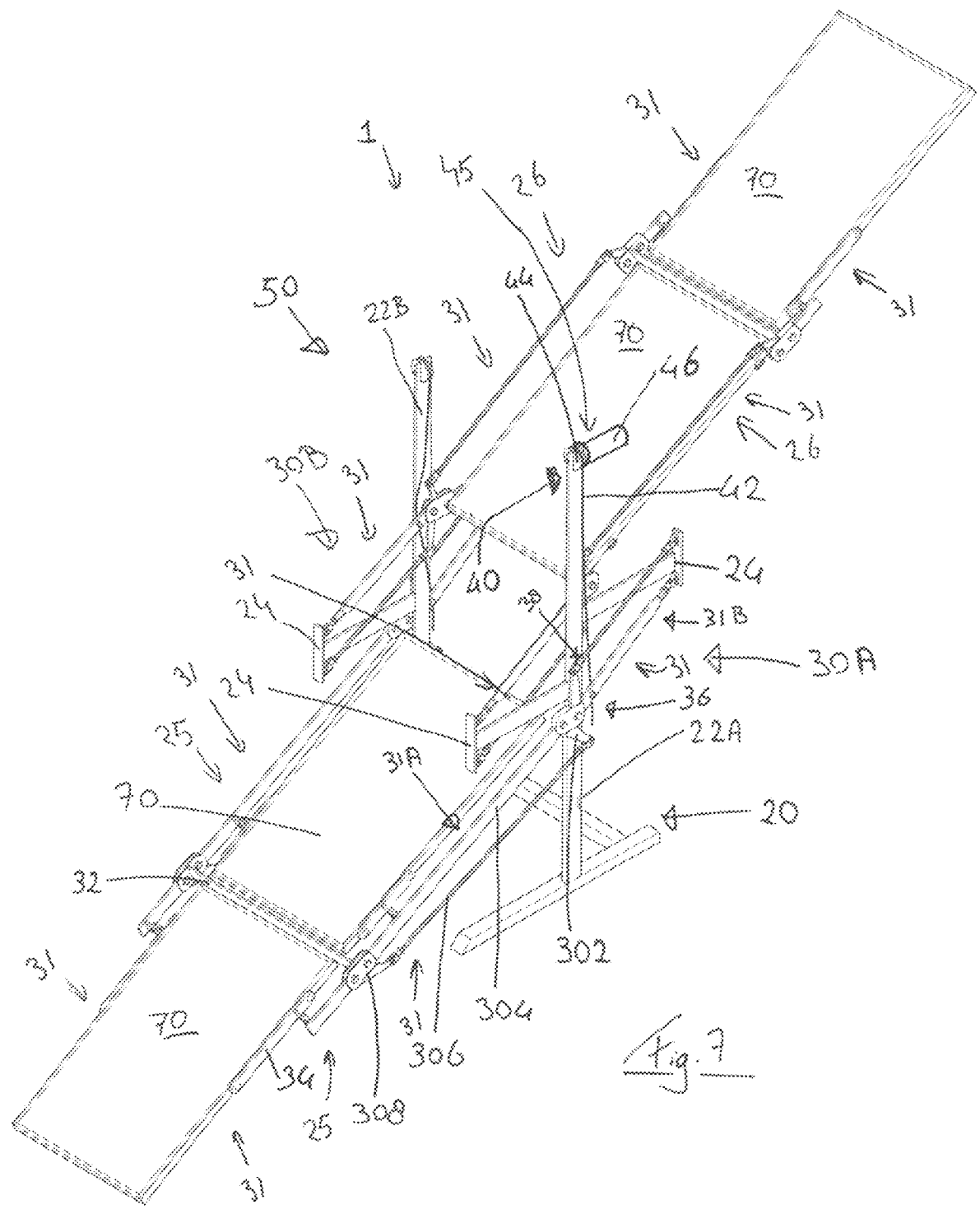
FIG. 7 shows an isometric view of another embodiment of the invention in the deployed position.
Figure 8:
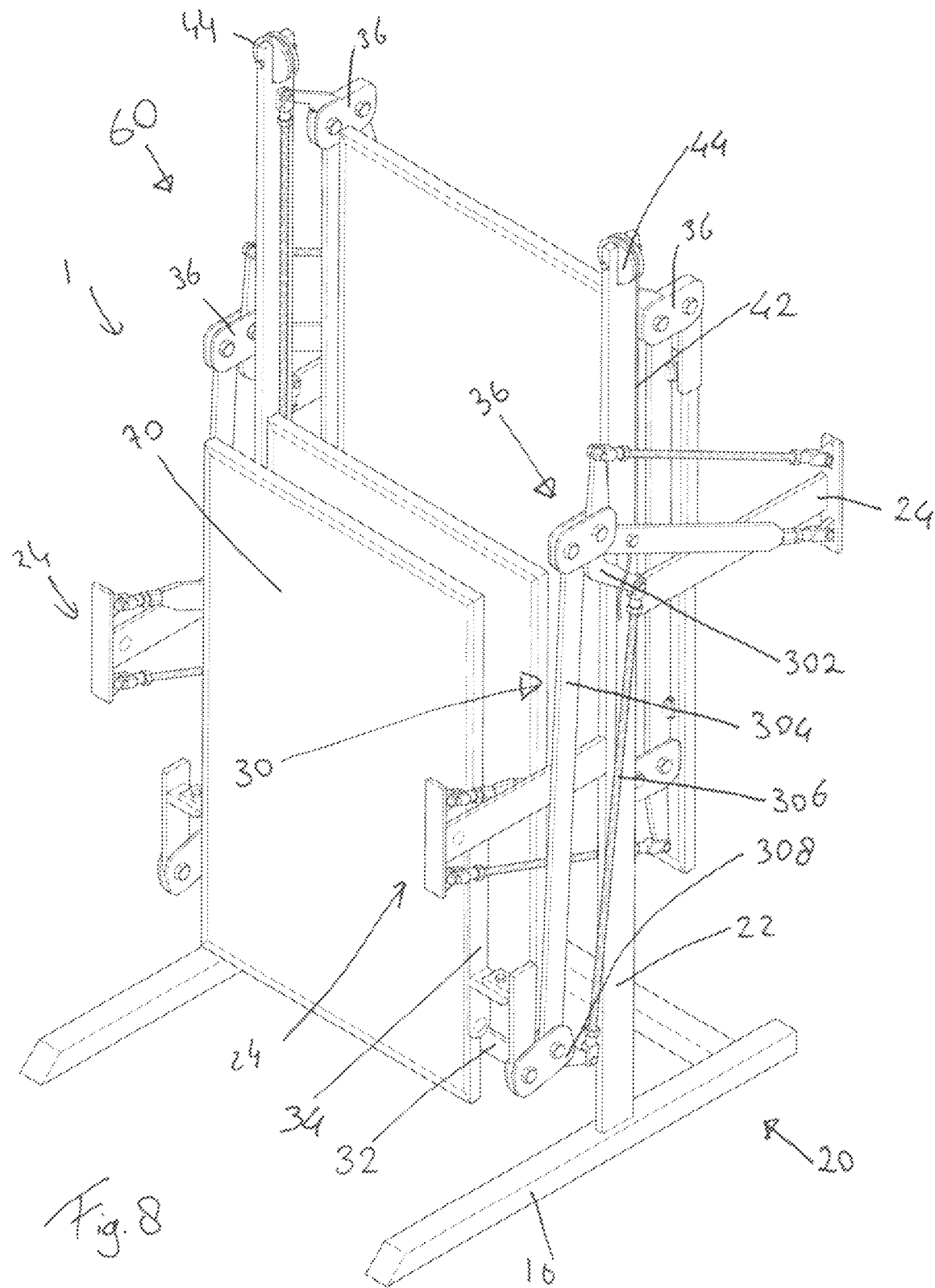
FIG. 8 shows an isometric view of an embodiment of the invention in the undeployed position.
Figure 9:
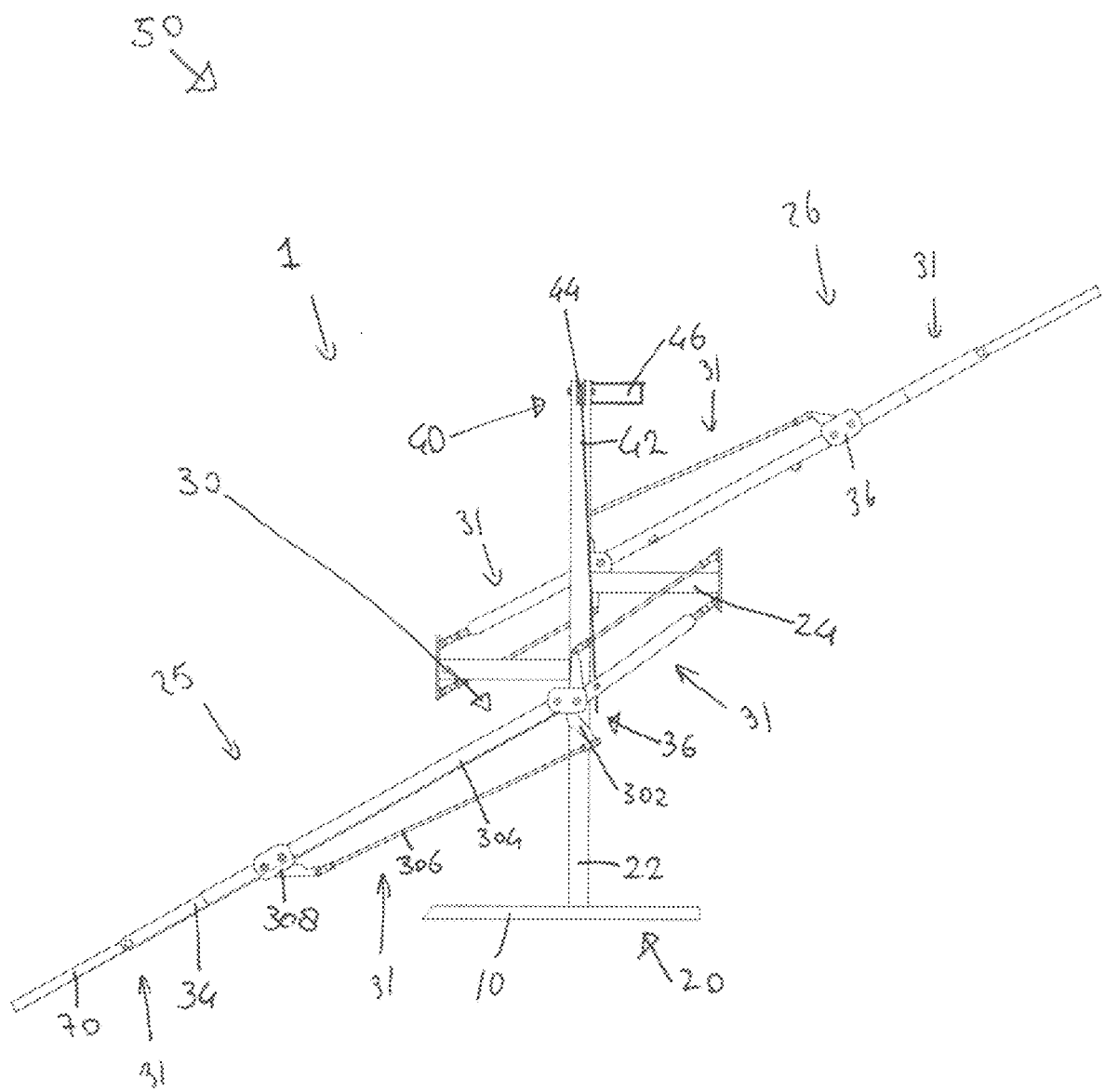
FIG. 9 shows a side view of another embodiment of the invention in the deployed position.
Figure 10:
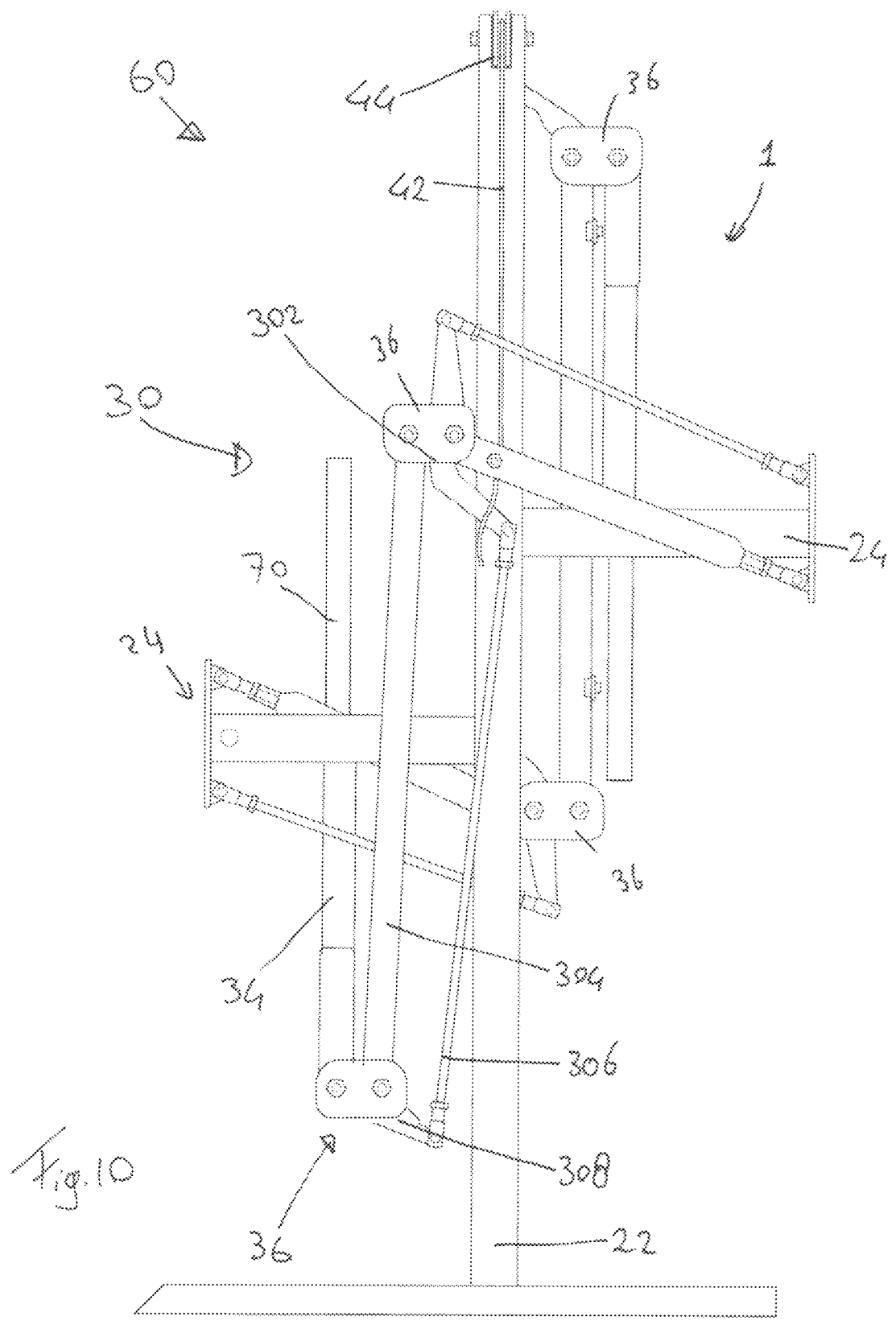
FIG. 10 shows a sideview of an embodiment of the invention in the undeployed position.
Figure 11:
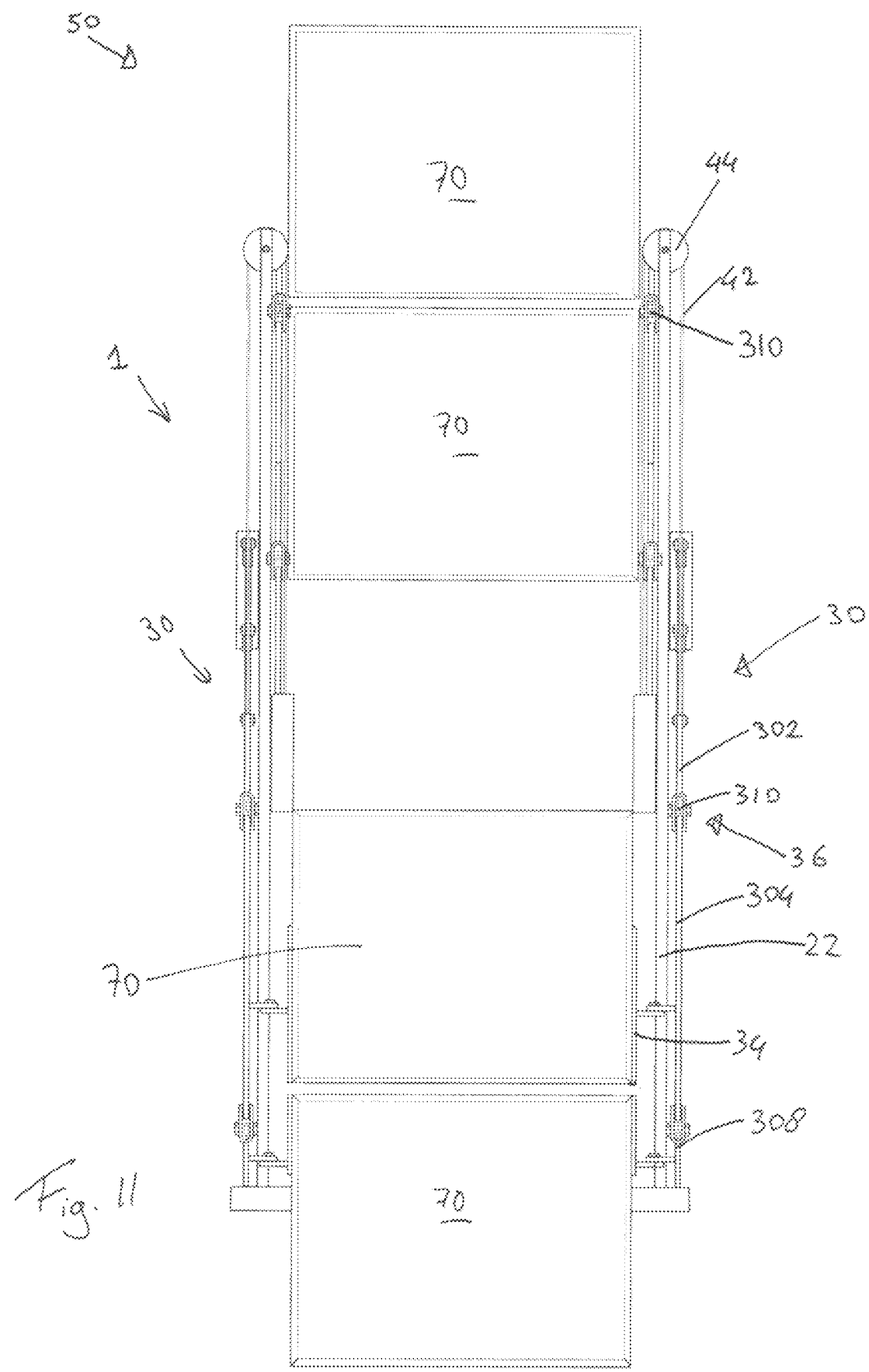
FIG. 11 shows a front view of another embodiment of the invention in the deployed position.

Because the rearward and forward arm parts 25, 26 are 2-fold rotationally symmetrical about the point of symmetry 38 located on the upwardly extending post 22A, the description of the forward arm part can also be applied to the rearward arm part. In FIGS. 7 and 9, the drive system 45 is shown comprising a motor 46.

The first segment 31B is connected to an arm mount 24 that extends rearwards from the post 22. The segment is connected to segment 31A via a hinge device 36. In this embodiment each segment 31 except the outer segments (the front and rear segments) comprises a four-bar linkage.

In this four-bar linkage, the ground link 302 is connected to an input link 304 and to an output link 306, the input and output link are connected to a connecting link 308. The hinge device 36 comprises the ground link 302 of a segment and the connecting link 308 of a previous segment. The input links 302 of these segments comprise rotational coupling means 310 that couple the rotation of a segment to the rotation of another connected segment.

In the embodiment shown in FIG. 7, the drive system comprises a connection 42 between the forward and rearward arm parts. This connection comprises a wire that runs over a pulley 44 and can be pulled in both directions by a motor 46. The pulling of the wire in both direction results in the folding or unfolding of the foldable solar panel assembly.

In the folded position and during the folding movement, an arm mount may hinder the folding of the forward arm part if the solar panel 70 would span over the entire distance between articulated support arm mechanisms 30A and 30B. Therefore the solar panel 70 is connected to the articulated support arm mechanism 30 via a connecting piece 34 that defines a gap that clears the articulated foldable support arm mechanism during the folding movement and in the folded, undeployed position.

Turning to FIG. 12, a cross-sectional view is shown of the hinge device 36 for the embodiment wherein two segments are four-bar linkages. The input link 304A comprises means 310A for the rotational coupling to another input link 304B that comprises rotational coupling means 310B for the rotational coupling to input link 304A. The ground link 302A of one segment is rigidly connected to the connecting link 308B of the segment. Because the output links 306B and 306A are also connected to the connecting links 308B and 308A and ground links 302A and 302B, the rotation of the input links 304A and 304B with respect to each other causes the entire segments to rotate with respect to each other.

Turning to FIGS. 13 to 15, the same embodiment of FIGS. 4 to 6 is shown in more detail. Wherein FIG. 13 depicts the deployed position 50, FIG. 14 depicts an intermediate position, and FIG. 15 depicts the undeployed position 60.

The first segment 31B is connected to the post 22 via an arm mount 24. The segment is connected to segment 31A via a hinge device 36. In this embodiment only segment 31B comprises a four-bar linkage.

In this four-bar linkage, the input link 304 and the an output link 306 are connected directly to the arm mount 24, the input and output link are also connected to a connecting link 308. The input links 302 of segment 31B and the forward outer segment 31A comprise rotational coupling means 310 that couple the rotation of segment 31B to the rotation of the connected forward outer segment 31A.

In this embodiment, no additional coupling connection 42 is comprised by the drive system because the forward and rearward arm parts arm rigidly connected to each other.

Figure 16A:
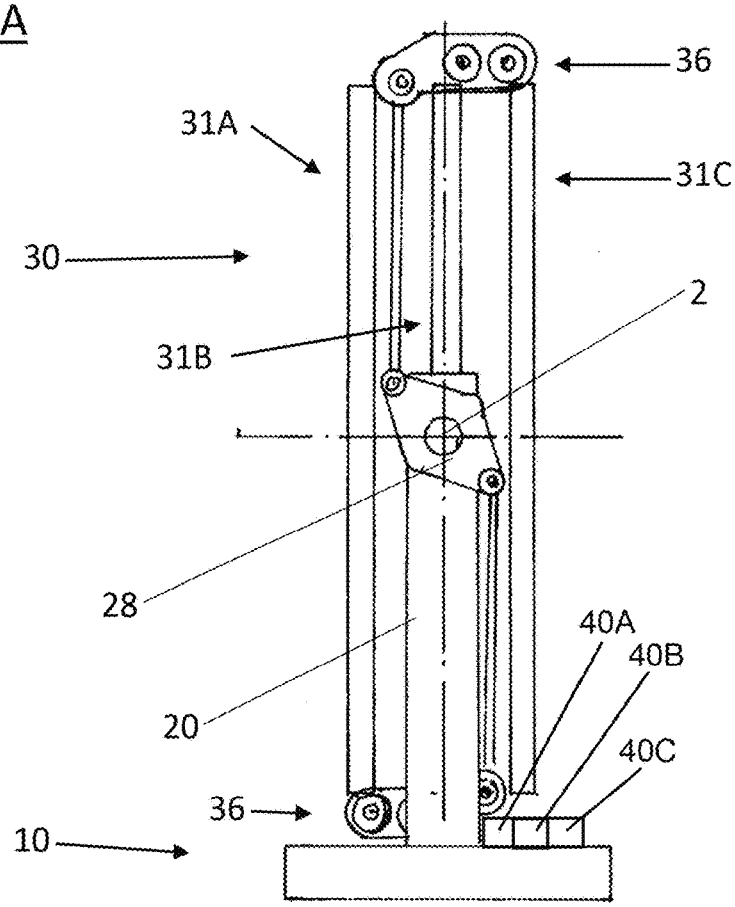
FIGS. 16A-16D show a side view on the invention in the undeployed and deployed position illustrating rotation about a horizontal axis.
Figure 16B:
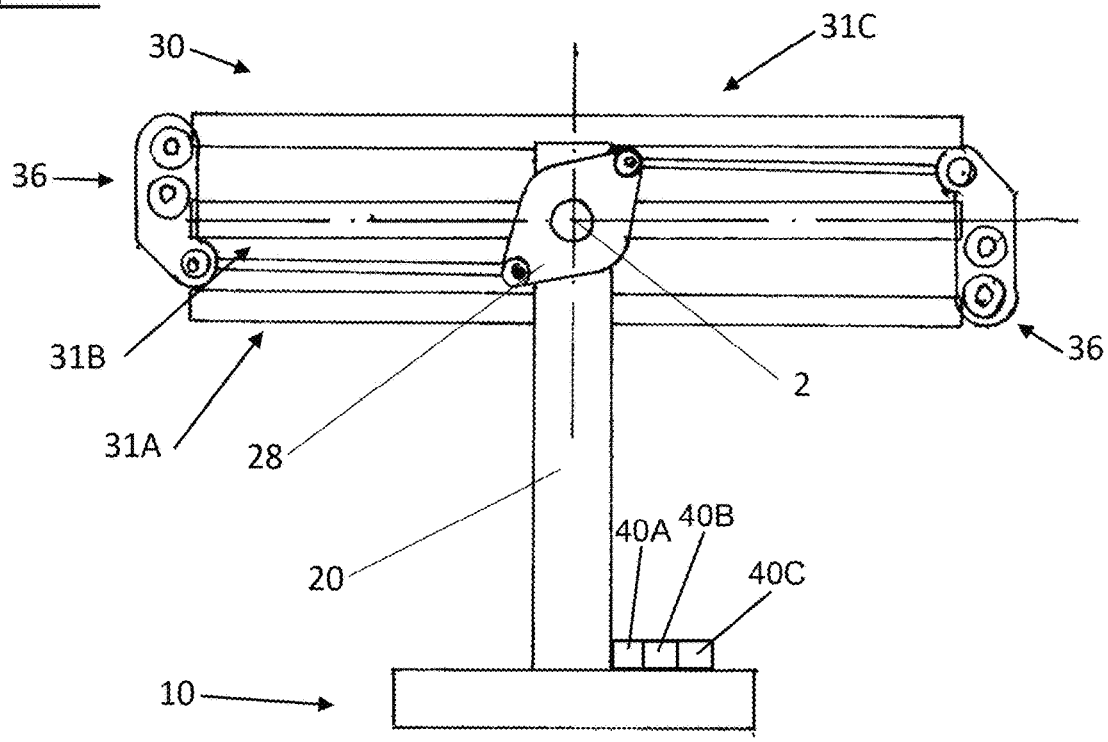

FIGS. 16A and 16B show the foldable solar panel assembly in the folded state 60 in two positions. FIG. 16A shows the foldable solar panel assembly in a vertical position 62, wherein the solar panels are oriented substantially vertical and FIG. 16B shows the foldable solar panel assembly in a horizontal position 64, wherein the solar panels are oriented substantially horizontal.

In the depicted embodiment, the articulated support arm mechanism 30 is connected to the frame 20 by a rotational connector 28 which allows rotation of the articulated support arm mechanism 30 relative to the frame about a horizontal rotation axis 2. This connection enables the articulated support arm mechanism to be rotated over an angle relative to the frame 20.

By rotating the foldable solar panel assembly in the depicted folded state 60, the solar panels 70 can be oriented to adjust the frontal surface of the solar panels. Advantageously, because the system is in balance, this takes very little effort and can be achieved by a small actuator or by minimal physical effort.

Further, the foldable solar panel assembly is shown to comprise a sensor to measure the position of the sun (40A) with respect to the foldable solar panel assembly, a sensor to measure the direction of the wind (40B) with respect to the foldable solar panel assembly, and a sensor to measure the wind speed (40C) with respect to the foldable solar panel assembly. The data acquired with these sensors can be used to decide when to deploy or not to deploy the foldable solar panel assembly and can be used to orient the solar panels in an optimal manner.

Figure 16C:
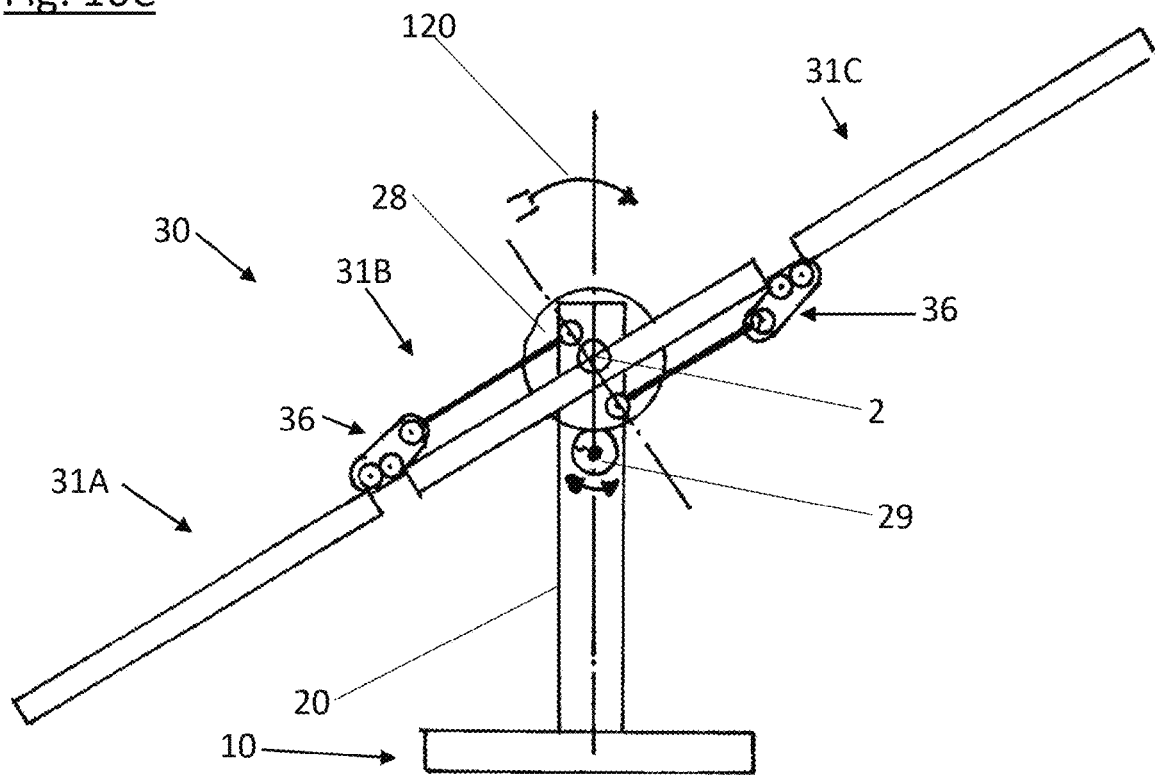
Figure 16D:
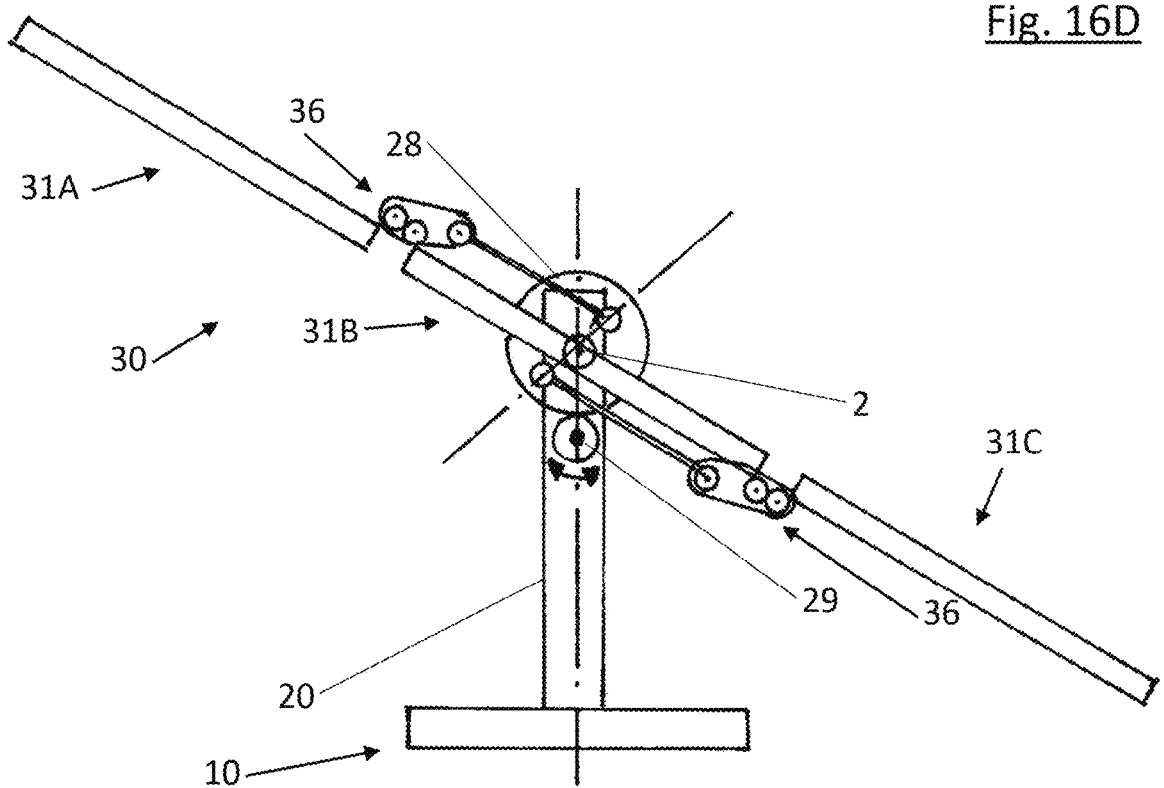

In the unfolded state 50 depicted in FIGS. 16C and 16D the same rotation can be achieved with a similar effort because the system remains balanced throughout the rotation. This does not only enable the solar panels to be oriented in reaction to adverse weather, but more importantly, the panels can be oriented to follow the sun while it changes positions during the day. The arrow 120 in FIG. 16C depicts the direction of rotation to arrive at FIG. 16D following a sun that would move from the left upper corner of the sheet towards the right upper corner of the sheet passing over the foldable solar panel assembly.

Because the amount of power required to rotate the panels about the horizontal axis 2 can be very small relative to the power gained through the increase of efficiency by following the sun, this is a large advantage. The rotation can be achieved by a rotation actuator 29 configured to actuate a rotation the articulated support arm mechanism 30 about the horizontal rotation axis 2.

Figure 17E:
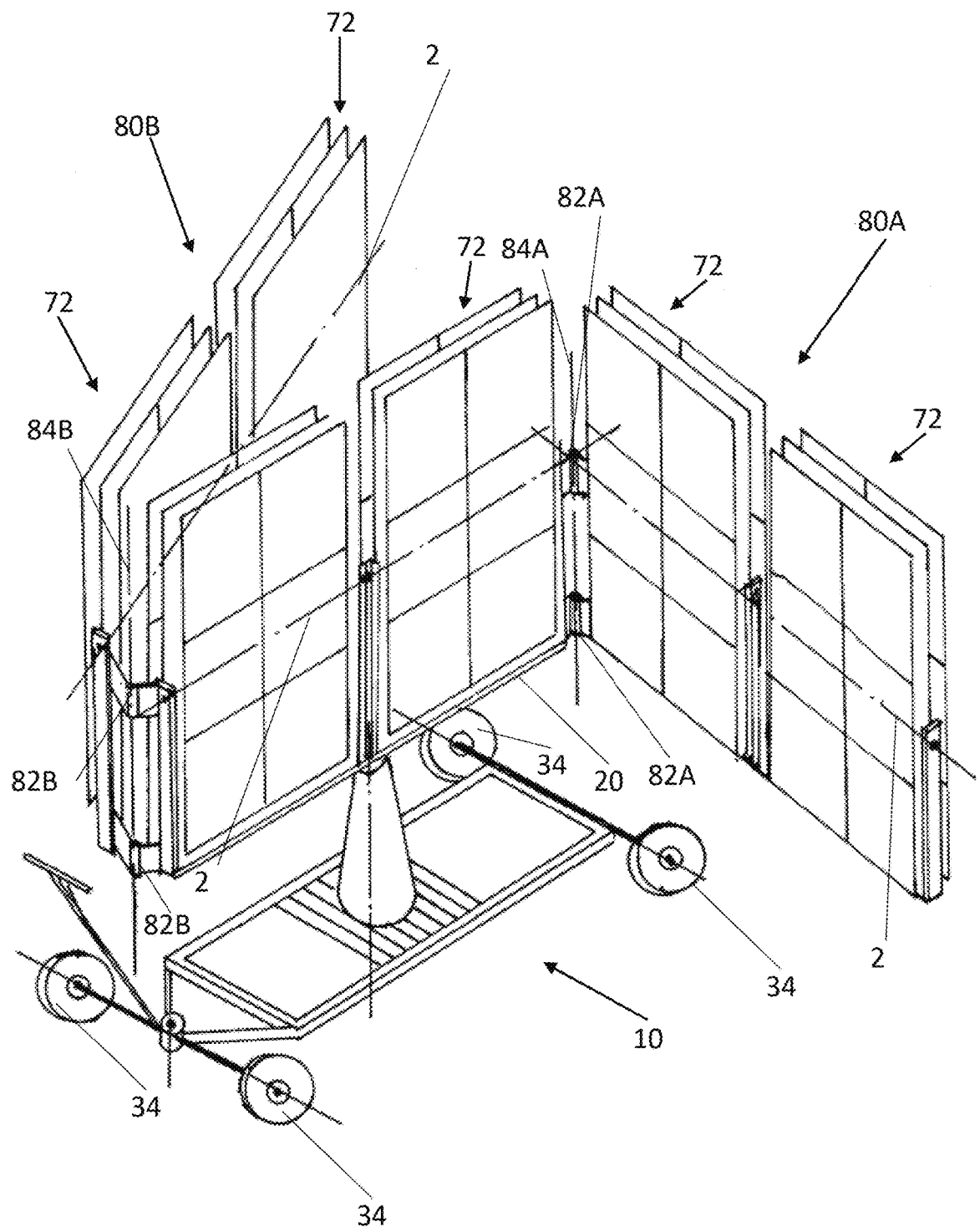
Figure 18E:
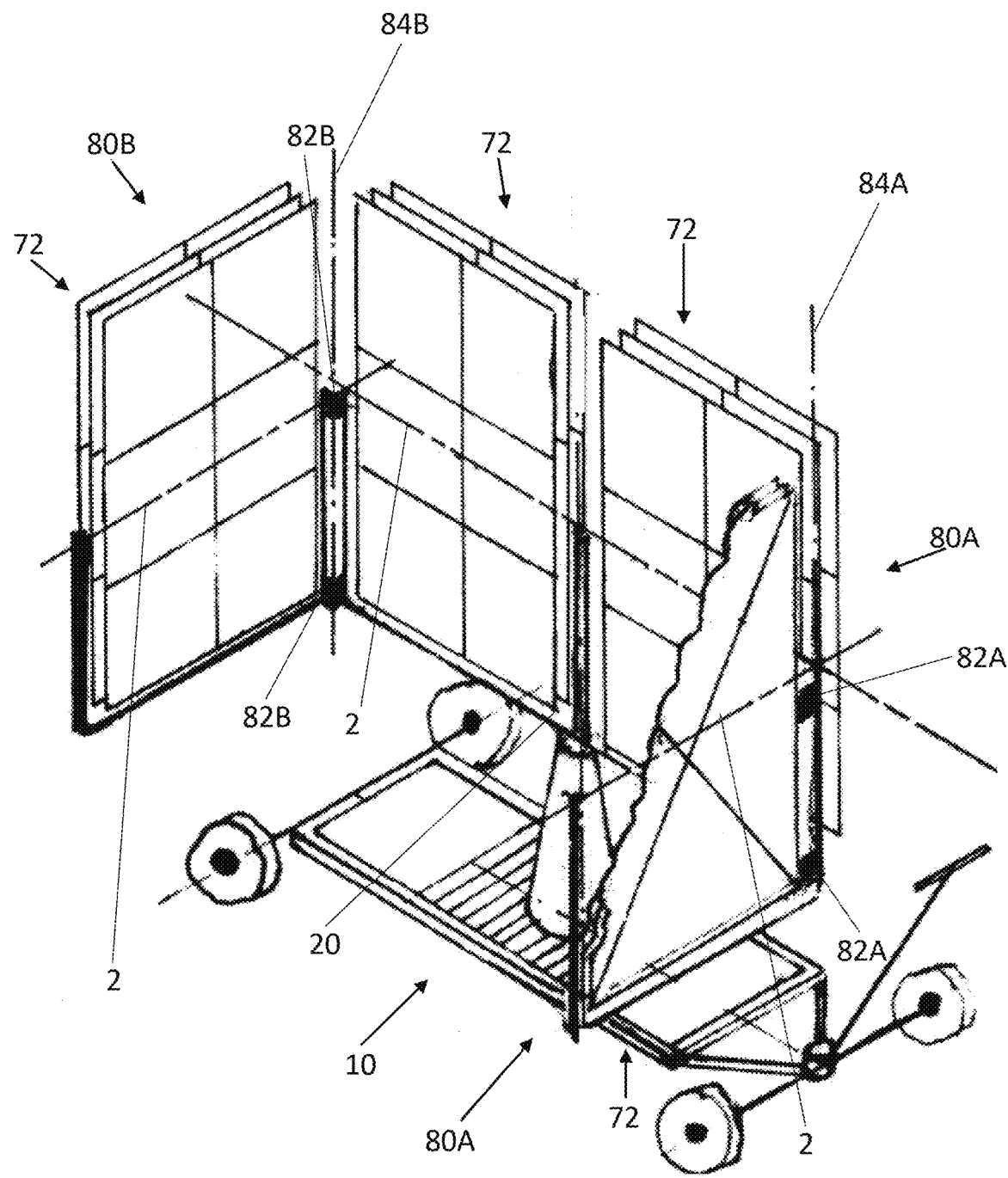

Turning to FIGS. 17A-17E, an embodiment is depicted wherein the foldable solar panel assembly further comprises two side panel assemblies 80A, 80B that are hingedly connected to the frame 20 about hinge axis 84A, 84B. FIGS. 17A and 17B respectively show a top view of the foldable solar panel assembly in a compact state 90 and a deployed state 92. FIGS. 17C and 17D show the foldable solar panel assembly respectively in the same states but in front view. FIG. 17E shows the foldable solar panel assembly in the deployed state 92 in an isometric view.

Each side panel assembly 80A, 80B is schematically shown wherein each set of panels 72 represents two articulated support arm mechanisms with their corresponding solar panels. In the compact state, especially visible in FIG. 17A, a right end of a first side panel assembly 80A is connected by a hinge 82A to a right side of the frame 20 and a left end of a second side panel assembly 80B is connected by a hinge 82B to a left side of the frame. Herein, the solar panels supported by the first side panel assembly are located in front of the solar panels supported by the frame and the solar panels supported by the second side panel assembly are located behind the solar panels supported by the frame. Therefore, in the compact state, no photovoltaic surfaces face outwards; only the backs of the solar panels 70 face outwards. Not only does this protect the solar panels from foul weather, it also protects them from vandals and flying debris.

In order to arrive at the compact state 90 from the deployed state 92 of FIGS. 17B and 17D, the first side panel assembly 80A initially located on the right of the frame is rotated clockwise depicted by arrow 100 to arrive in front of the solar panels supported by the frame in the compact state. The second side panel assembly 80B initially located on the left of the frame is rotated clockwise depicted by arrow 100 behind the solar panels supported by the frame in the compact state.

To protect all the solar panels, the width of the first side panel assembly and the width of the second side panel assembly correspond to the width of the solar panels supported by the frame. In doing so, all the vulnerable photovoltaic surface is kept protected.

Besides protecting the vulnerable surface of the solar panels, it will also be readily understood that the foldable solar panel assembly is very well transportable and storable in the compact state 90 while still offering a large operational photovoltaic surface in the deployed state 92.

In the depicted embodiment, the base 10 is connected to wheels 14 in order for the foldable solar panel assembly to be moveable.

In FIG. 18A-18E, an embodiment is depicted wherein, when viewed in top view, in the compact state 90 a right end of the first side panel assembly 80A is connected by a hinge 82A to a right side of the frame and a left end of the second side panel assembly 80B is connected by a hinge 82B to a left side of the frame. Herein, a solar panel supported by the first side panel assembly 80A is located in front of the solar panels supported by the frame and the solar panel supported by the second side panel assembly 80B is located in front of the solar panels support by the frame as well. Similarly to the situation in FIGS. 17A and 17C, in the compact state 90, no photovoltaic surface faces outwards; only the backs of the solar panels 70 face outwards.

To move the foldable solar panel assembly from the deployed state 92 of FIGS. 18B and 18D to the compact state 90, the first side panel assembly 80A initially located on the right of the frame is rotated clockwise depicted by arrow 100 in front of the solar panels supported by the frame. The second side panel assembly 80B initially located on the left of the frame is rotated counter-clockwise depicted by the arrow 110 in front of the solar panels supported by the frame 20 as well.

To protect all the photovoltaic surface of the solar panels, the first side panel assembly has a width of half the solar panels supported by the frame and the second side panel assembly has the same width. In doing so, in the compact state, all the vulnerable surfaces face inwards.

It can also be seen that in the deployed state and the compact state, all the solar panels of each are substantially co-planar. The hinge axes of the articulated support arm mechanisms are therefore also substantially parallel. When the foldable solar panel assembly is unfolded, this results in a surface that is substantially co-planar and thus can be oriented towards the sun so that each panel has an optimal orientation.

Figure 19A:
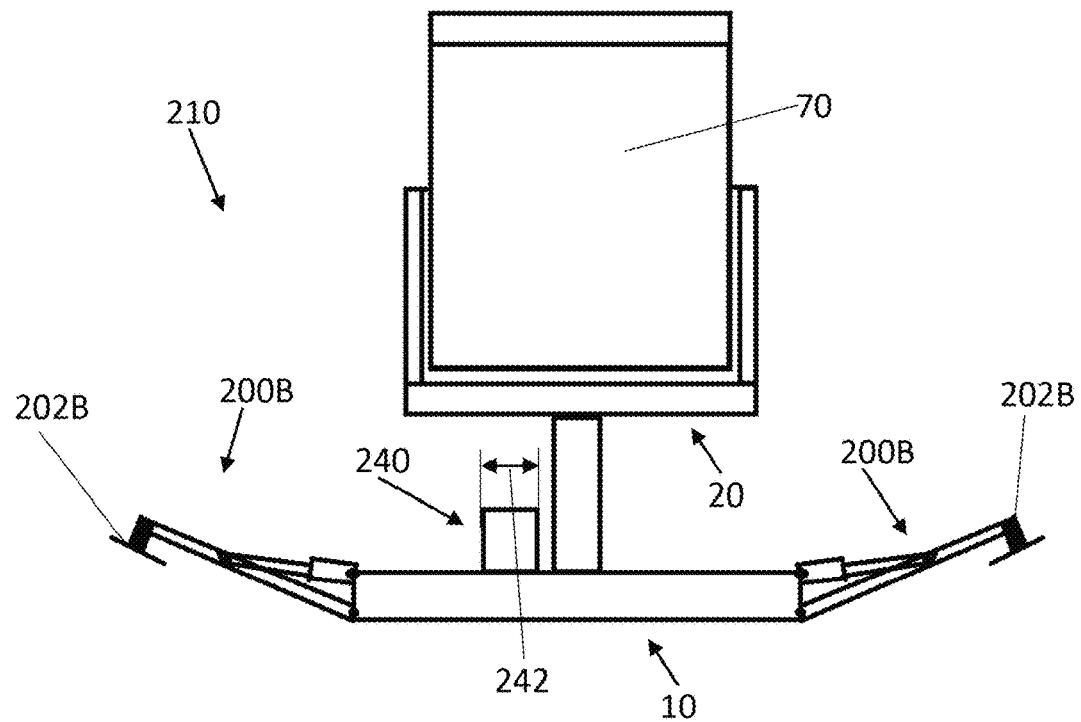
FIGS. 19A-19c show an embodiment of the invention comprising outriggers and a battery housing.
Figure 19B:
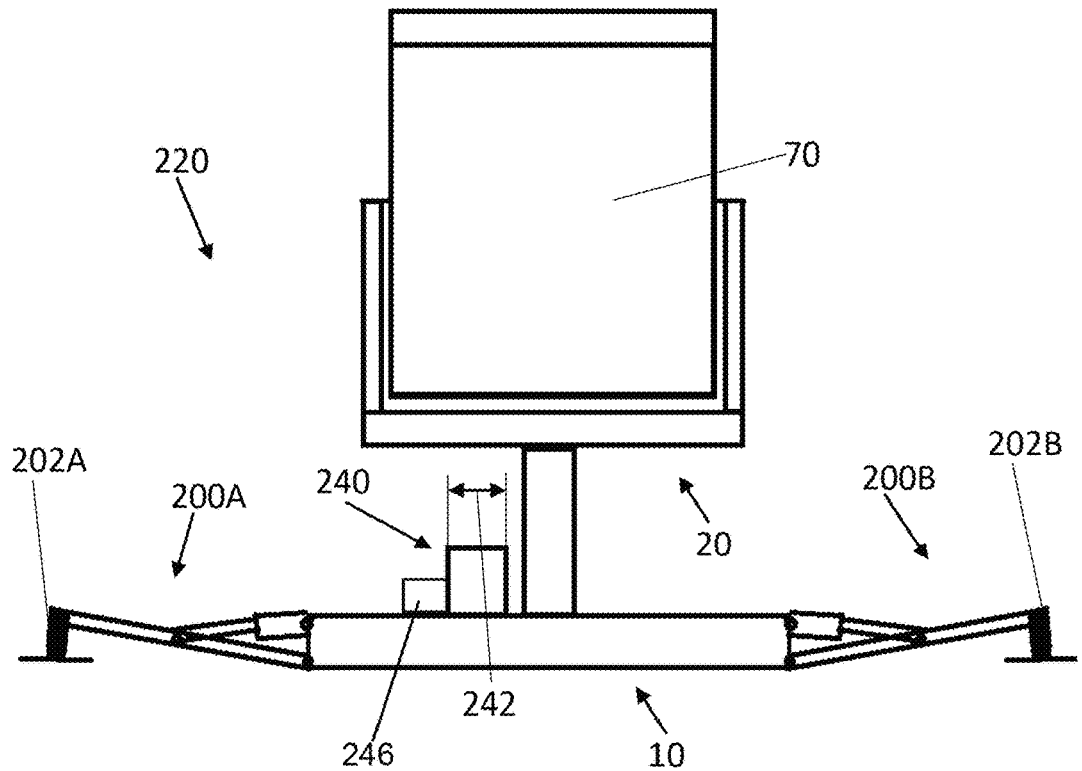
Figure 19C:
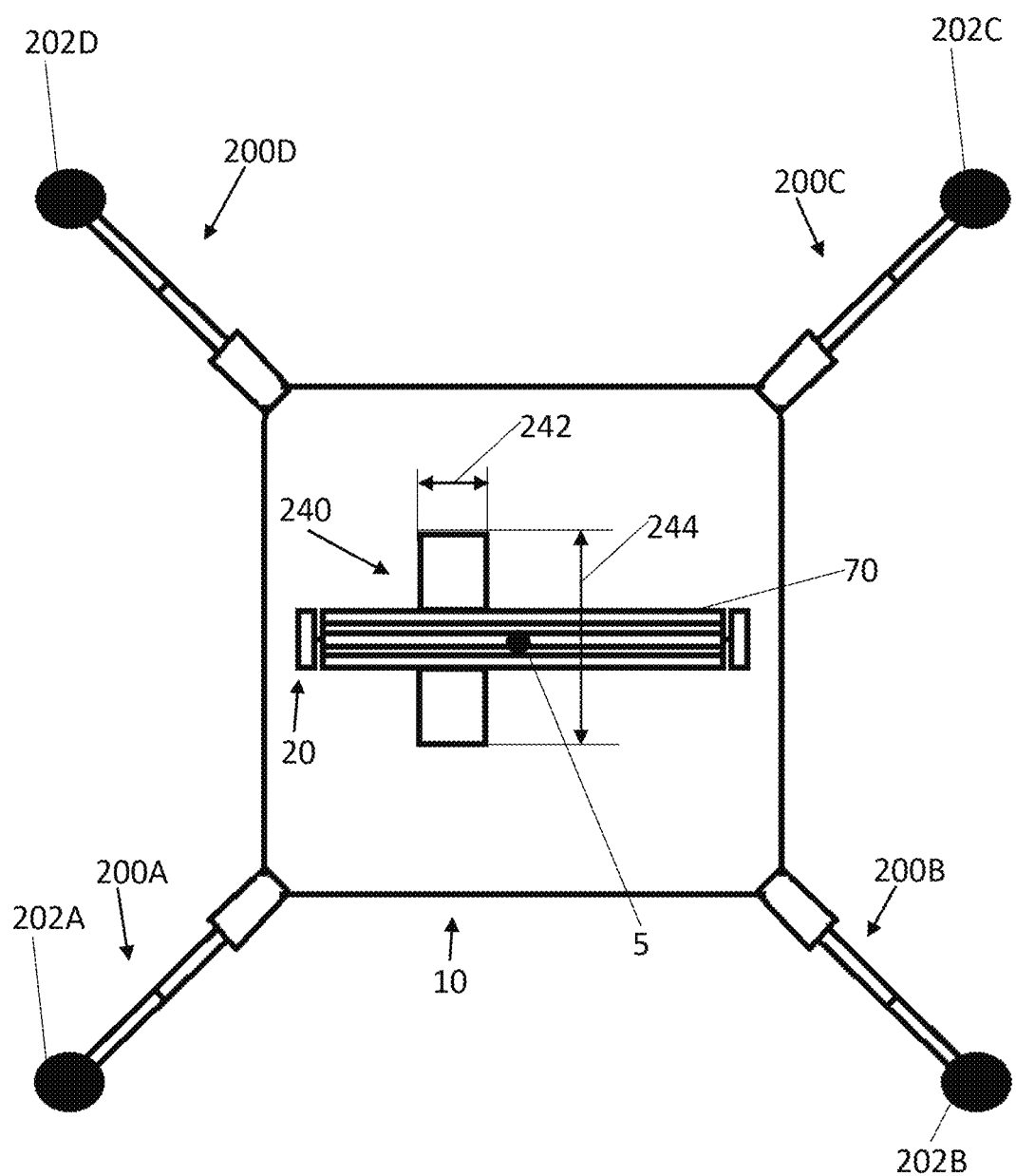

Turning to FIGS. 19A-19C, an embodiment of the foldable solar panel assembly is depicted wherein it further comprises four moveable outriggers 200A, 200B, 200C, 200D. In FIG. 19A, the moveable outriggers are located in a retracted position 210 where they are not in contact with the ground. In FIG. 19B the moveable outriggers have been moved downwards to a deployed position 220. In the deployed position, the outriggers are contacting the ground and their outer ends 202 are located at an outrigger distance of the centre of gravity 5 of the foldable solar panel assembly. This stabilizes the foldable solar panel assembly so that it does not fall over as a result of an uneven terrain or gusts of wind.

Also, the foldable solar panel assembly comprises a battery housing 240 located on the lower side of the base, wherein the battery housing is defined by a battery length 244 and battery width 242 and is configured to accommodate a battery. A power supply system 246 is depicted, wherein the power supply system comprises power electronics and is configured to connect an electrical device to the battery.

Figure 20A:
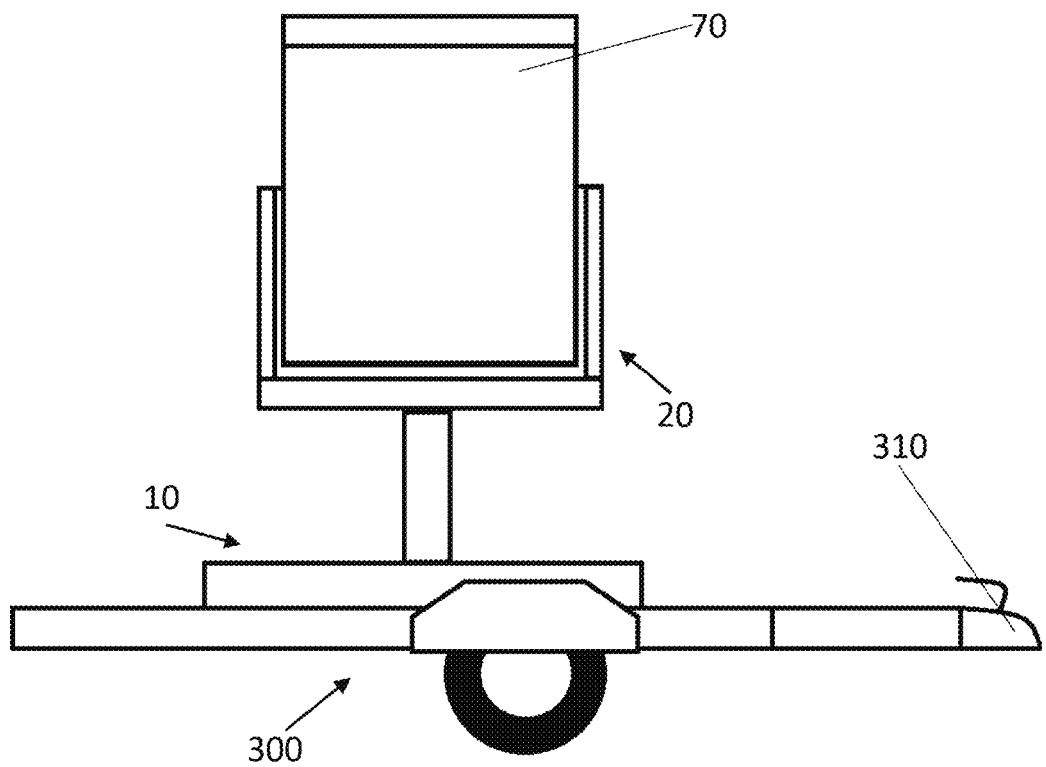
FIGS. 20A-20B show an embodiment wherein the invention is connected to a trailer.
Figure 20B:
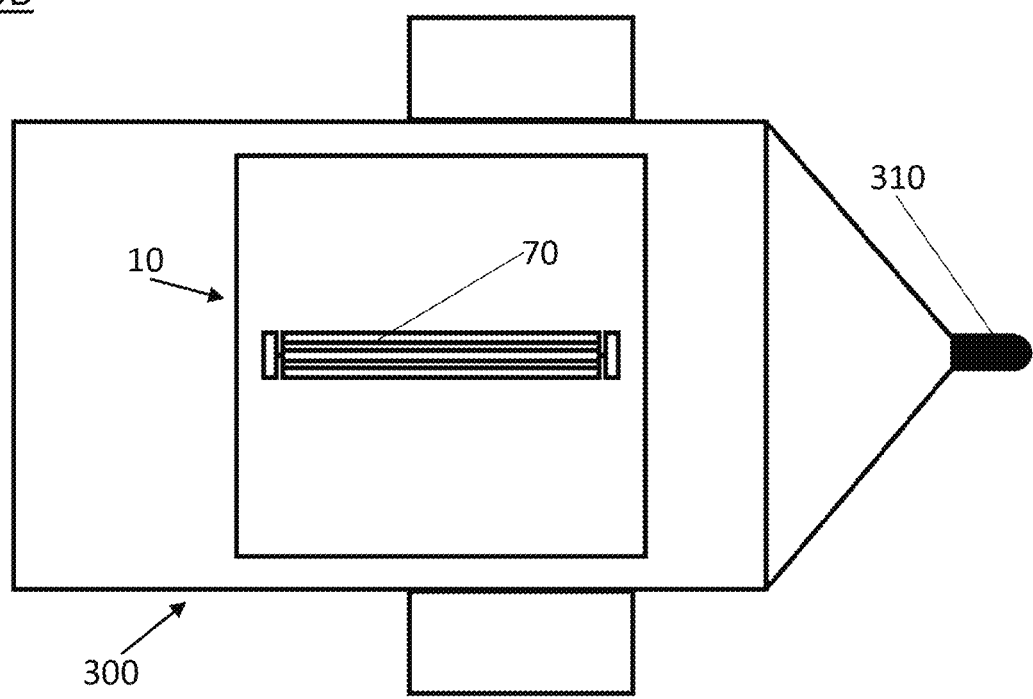

Turning to FIGS. 20A and 20B, a schematic side view and a top view are provided of an embodiment of the foldable solar panel assembly wherein the base is positioned on a trailer 300 that is comprises a connector 310 to be mounted to a car, This enables a user of the foldable solar panel assembly to take the panel along with them so that they can fulfil their power supply wherever they are.

Figure 21A:
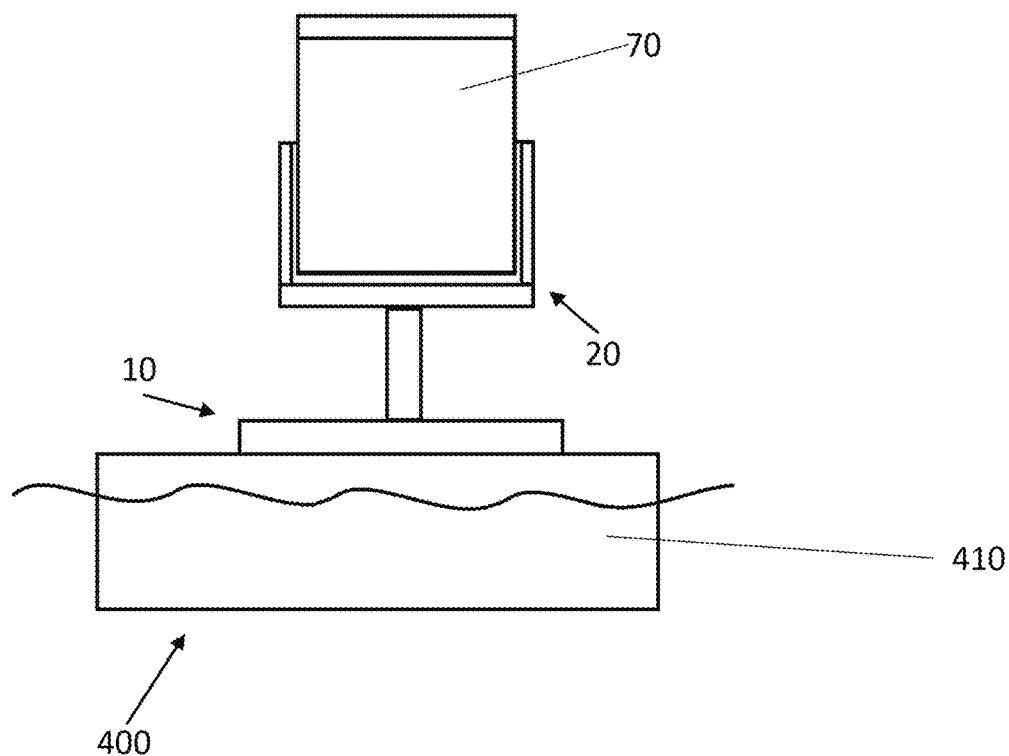
FIGS. 21A-21B show an embodiment wherein the invention is connected to a floating device.
Figure 21B:
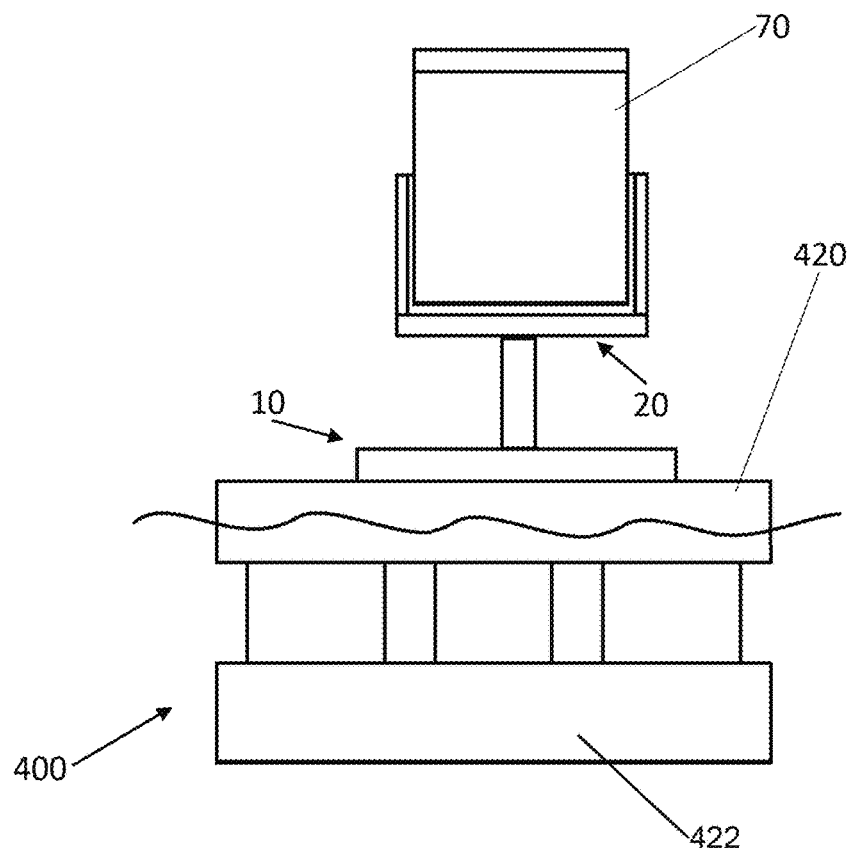

Turning to FIGS. 21A and 21B, a schematic side view is shown of the foldable solar panel assembly being connected to a floating device 400. Even though only a single set of solar panels 70 is shown, it will be understood that a large area of foldable solar panels assemblies can be deployed and operated on a floating device. The floating device may also be configured to rotate about a vertical axis to orient the deployed solar panels towards the sun. In FIG. 21A, the floating device comprises a pontoon 410 and in FIG. 21B, the floating device comprises a semi-submersible 420. In FIG. 21B, a lower part 422 of the floating device 400 provides the buoyancy to keep the foldable solar panel assembly above the water, wherein the lower part 422 is not affected by surface waves.

In FIG. 22A-22E, a depiction is provided wherein the foldable solar panel assembly is configured to allow or prevent rain and sunshine to reach land 95 located beneath the foldable solar panel assembly.

Figure 22A:
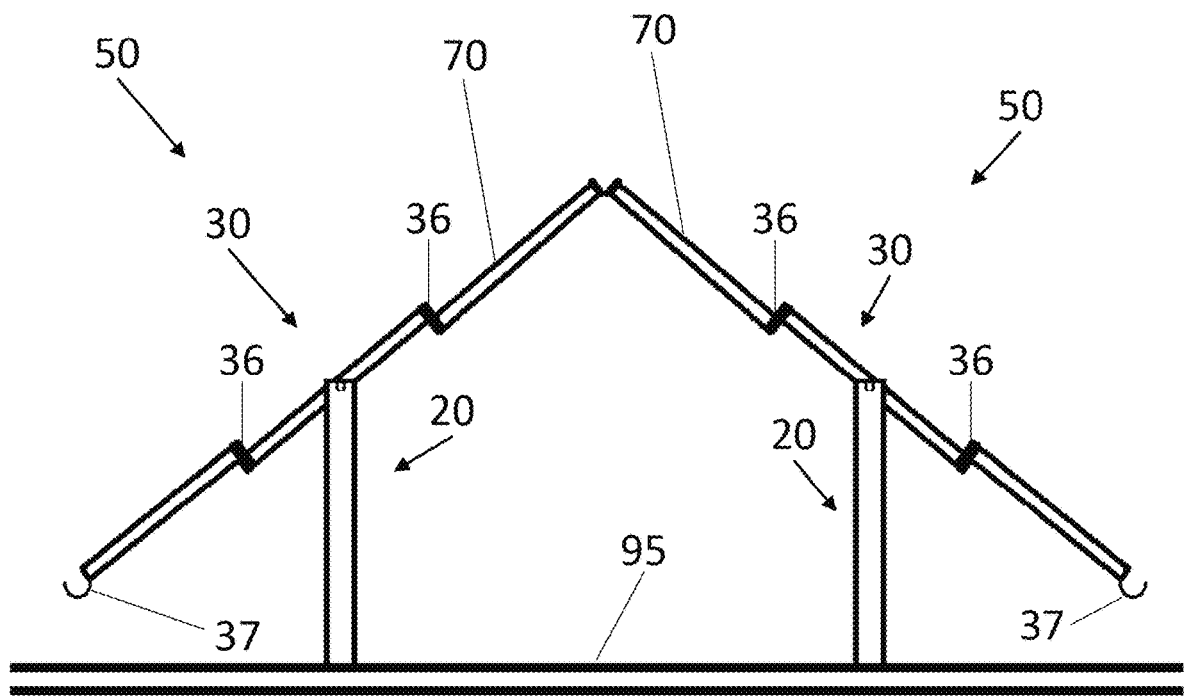
Figure 22B:
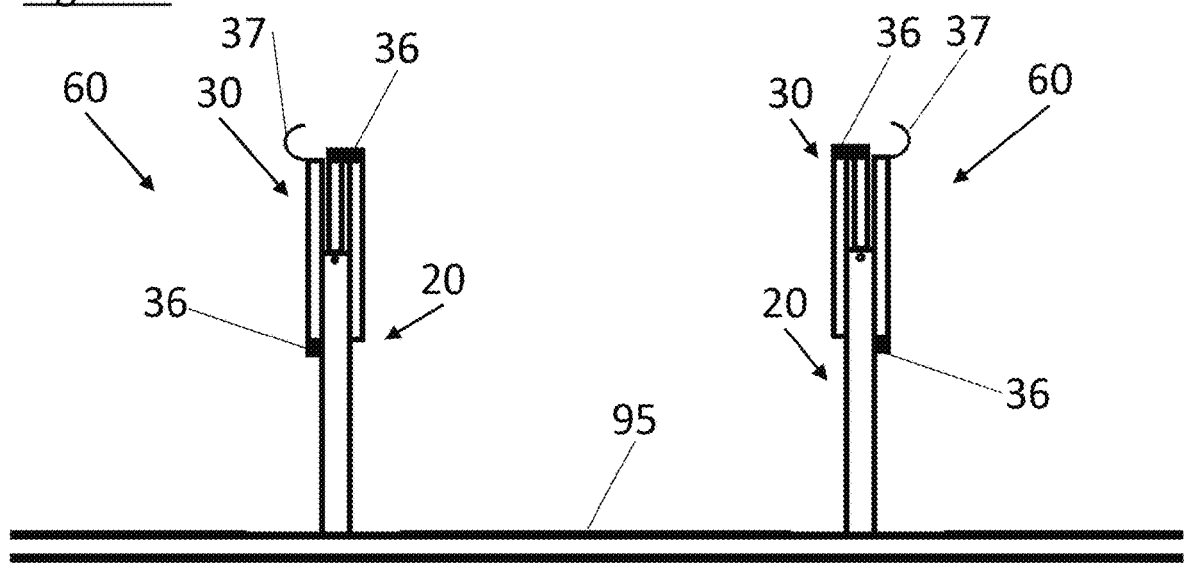
Figure 22C:
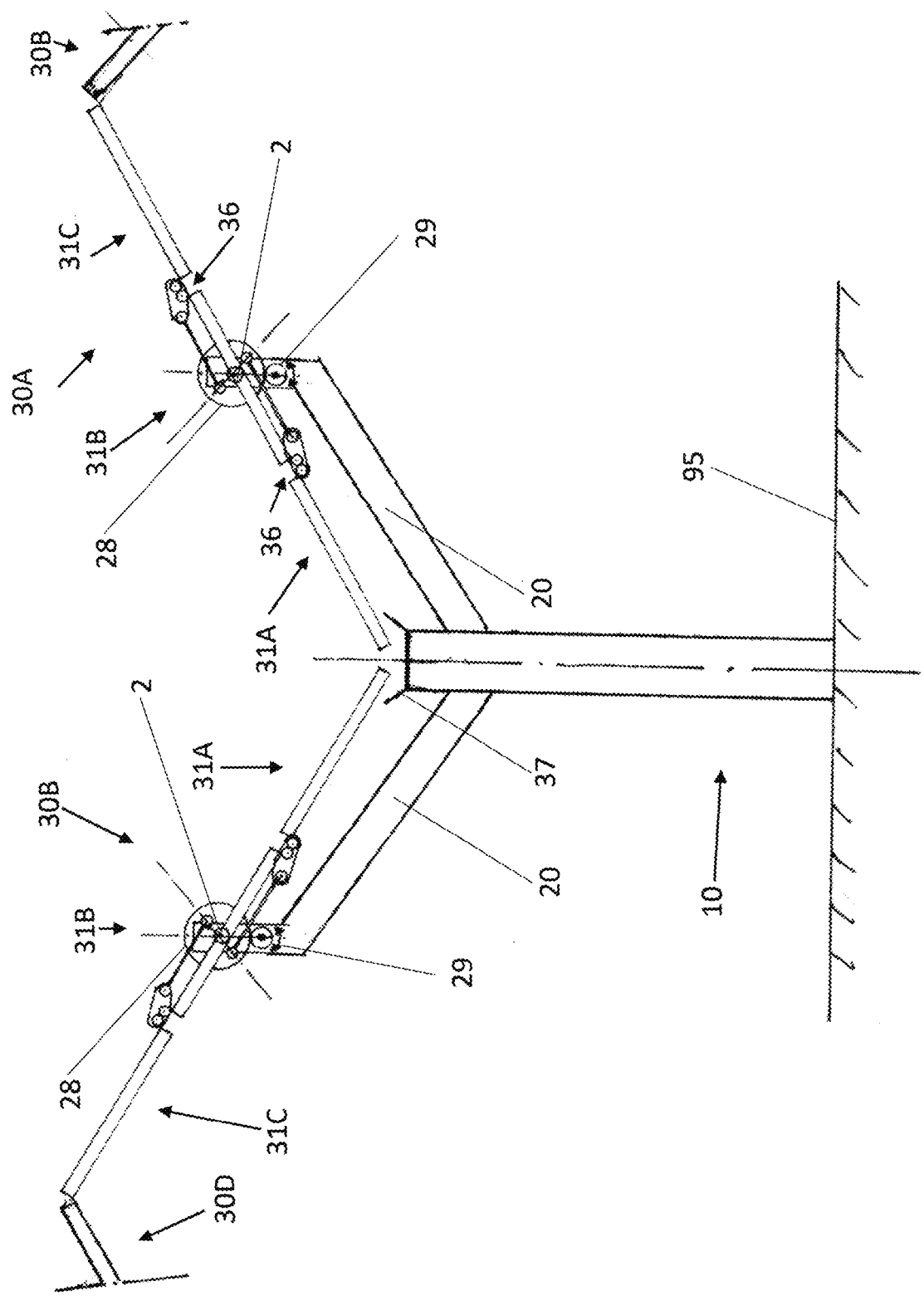
Figure 22D:
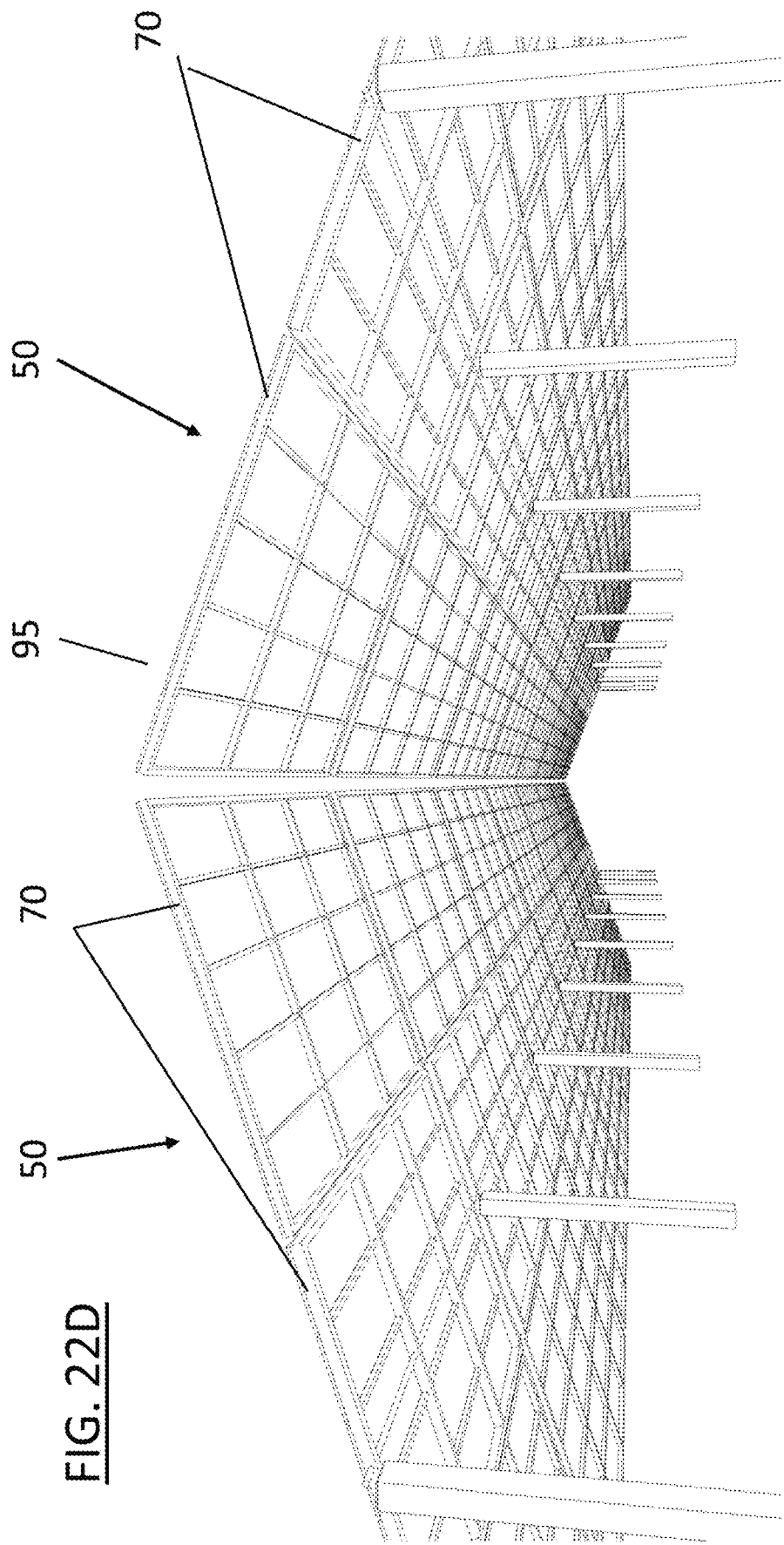

In FIGS. 22A, 22B and 22D, an embodiment is shown wherein two foldable solar panel assemblies are shown comprising frames 20 that are located at a distance from each other. In the deployed position 50 depicted in FIGS. 22A and 22E, the solar panels form a roof for the land 95 located beneath the solar panels. The solar panels offer shade and shelter from rain for the underlying land. By folding and unfolding the foldable solar panel assemblies between the deployed position 50 and the undeployed position 60 (depicted in FIG. 22B), the environmental conditions for the land 95 can be controlled. The land may be kept at a certain moisture level by regulating the amount of rain on the land and can be protected by shade during days with too much sunlight. This way, the environmental conditions can be controlled. The foldable solar panel assembly further comprises gutters 37 that are configured to collect rain that falls on the solar panels. This rain can be used for example for irrigation purposes.

Figure 22E:
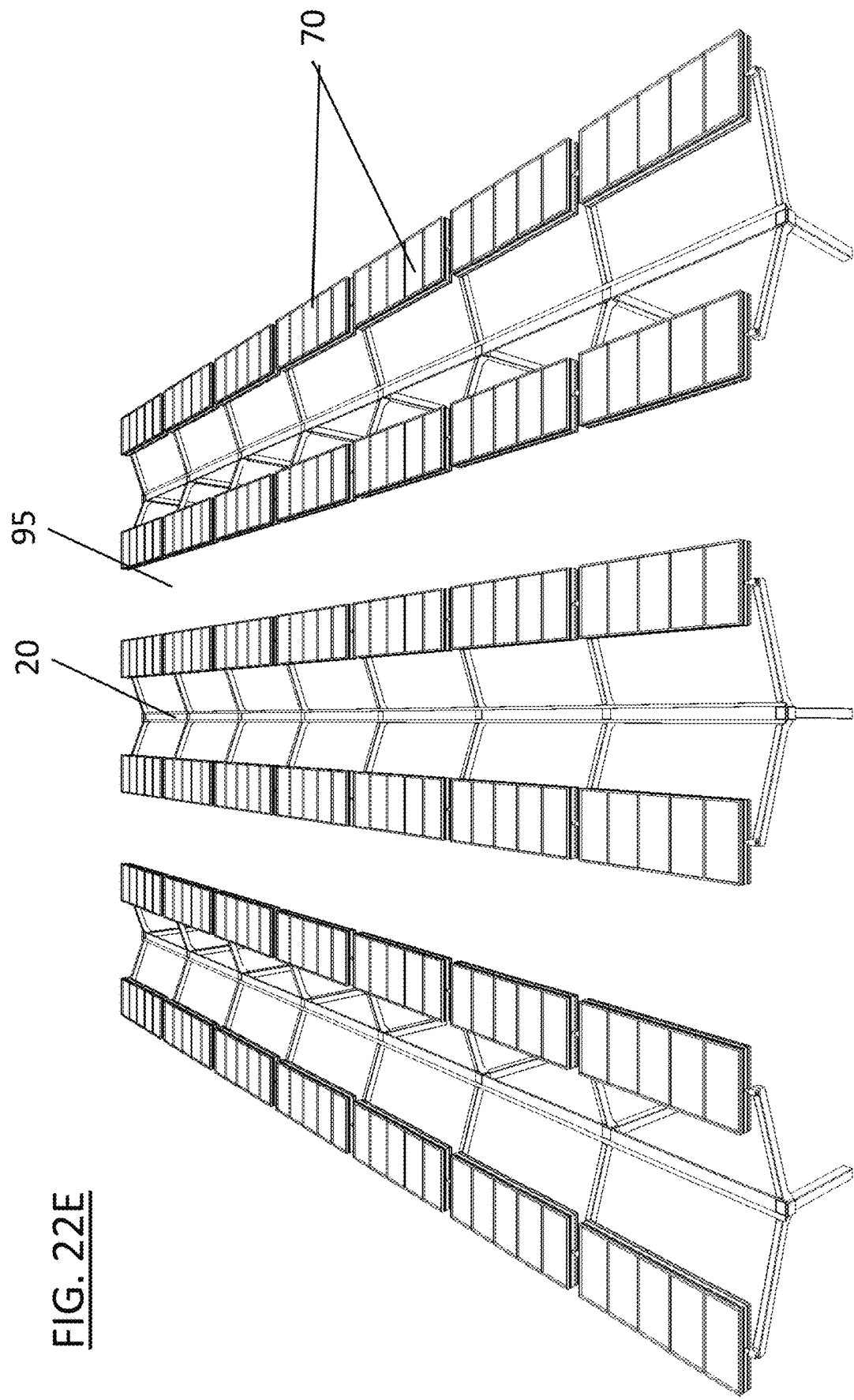

In FIGS. 22C, 22E, and 22F, an embodiment is depicted wherein the foldable solar panel assembly comprises two articulated support arm mechanism 30A, 30B. Each articulated support arm mechanism is an articulated support arm mechanism as described in FIGS. 16A-16D. Here, the articulated support arm is connected to the frame 20 by a rotational connector 28 and can be rotated by a rotation actuator 29. The solar panels connected to the articulated support arm mechanisms can collect rain and let it flow towards the gutter 37 where it is collected.

In FIG. 22C, on the left side and the right side of the depicted foldable solar panel assembly, extremities of articulated support arm mechanisms 30B, 30D are depicted. These are extremities of foldable solar panel assemblies that are located next to the depicted foldable solar panel assembly and together can be perceived as a roof for the ground 95 located underneath the foldable solar panela assemblies.

In FIG. 22E, the undeployed foldable solar panel assemblies are oriented in a substantially horizontal direction. In FIG. 22F, the articulated support arm mechanisms have been rotated into a substantially vertical orientation about the horizontal axis making use of the rotational connector 28. By rotating between these two positions, a varying degree of shade and shelter can be obtained for the land 95 located beneath the foldable solar panel assemblies.

The terms "a" or "an", as used herein, are defined as one or more than one. The term plurality, as used herein, is defined as two or more than two. The term another, as used herein, is defined as at least a second or more. The terms including and/or having, as used herein, are defined as comprising i.e., open language, not excluding other elements or steps.

Any reference signs in the claims should not be construed as limiting the scope of the claims or the invention. It will be recognized that a specific embodiment as claimed may not achieve all of the stated objects.

The mere fact that certain measures are recited in mutually different dependent claims does not indicate that a combination of these measures cannot be used to advantage.

White lines between text paragraphs in the text above indicate that the technical features presented in the paragraph may be considered independent from technical features discussed in a preceding paragraph or in a subsequent paragraph.

The invention claimed is:

1. A foldable solar panel assembly, configured to support solar panels in a compact and folded, undeployed position, and in an unfolded, deployed position, and to fold and unfold between its deployed and undeployed position, the foldable solar panel assembly comprising:
   a base,
   a frame that is connected to the base and extends upwards from the base, the frame comprising:
      a single upwardly extending post, or
      two upwardly extending posts spaced at a horizontal distance from each other, wherein when seen in front view, a first post is located on the left of the frame and a second post is located on the right of the frame,
   wherein the frame comprises at least one arm mount per post,
   at least one articulated support arm mechanism configured to support one or more solar panels, wherein the at least one articulated support arm mechanism is connected to the arm mount, and wherein the at least one articulated support arm mechanism comprises:
      a forward arm part which when seen in side view in the deployed position extends forward from the at least one arm mount of the at least one upwardly extending post and
      a rearward arm part which when seen in side view extends rearwards from the at least one arm mount of the at least one upwardly extending post,
   wherein the forward arm part and rearward arm part of each articulated support arm mechanism are connected to each other and form a balance,
   multiple solar panels,
   a drive system configured to actuate the folding behaviour of the at least one articulated support arm mechanism,
   wherein the at least one articulated support arm mechanism comprises a plurality of segments and a plurality of hinge devices interconnecting the segments, each hinge device having one or more hinge axes about which the at least one articulated support arm mechanism folds,
   wherein the segments and the hinge devices are constructed to couple the rotations of the segments to one another during folding and unfolding in that, when a first segment rotates, a second segment which is connected via a hinge device to the first segment is forced to rotate relative to the first segment,
   wherein each segment supports at least one solar panel which extends away from said segment over a horizontal distance,
   wherein said hinge axes are oriented in a substantially horizontal direction.

2. The foldable solar panel assembly according to claim 1, wherein when seen in side view in the deployed position the at least one articulated support arm mechanism extends diagonally downwards and forwards from the at least one arm mount of the at least one upwardly extending post and extends diagonally upwards and rearwards from the at least one arm mount of the at least one upwardly extending post; and
   wherein in the folded, undeployed position the segments are folded onto one another.

3. The foldable solar panel assembly according to claim 1, wherein:
   the forward and rearward arm part of each articulated support arm mechanism are separate, wherein the forward arm part is connected to a first arm mount and the rearward arm part is connected to a second arm mount,
   a coupling connection between the forward and rearward arm parts, coupling the folding and unfolding movement of the forward and rearward arm parts to one another.

4. The foldable solar panel assembly according to claim 1, wherein each articulated support arm mechanism comprises a forward outer segment and a rearward outer segment and at least one intermediate segment which interconnects the outer segments, and
   wherein the forward outer segment and the rearward outer segment are connected to the at least one intermediate segment via respective hinge devices.

5. The foldable solar panel assembly according to claim 1, wherein, when seen in side view, the orientation of forward and rearward arm parts is rotationally symmetric about a point of symmetry.

6. The foldable solar panel according to claim 1, wherein a position of a centre of gravity of the combination of all the articulated support arm mechanisms does not change during folding and unfolding.

7. The foldable solar panel assembly according to claim 4, wherein:
   each segment, except the forward and rearward outer segments, comprises a four-bar linkage, and wherein each four-bar linkage comprises:
      a ground link,
      an input link that is hinged to the ground link and comprises means for the rotational coupling to another link at least at an extremity away from the ground link,
      an output link that is pivotably connected to the ground link, and
      a connecting link that is pivotably connected to the input and output link,
   the forward and rearward outer segments comprise means for the rotational coupling to an input link of a four-bar linkage at one extremity,
   wherein, in the first segment,
      either the ground link is rigidly connected to the at least one arm mount, or
      the input link and output link are rotatably connected to the arm mounts, and
   wherein in a second segment the ground link is connected to the connecting link of a first segment under an angle between 0 and 90 degrees, and,
   wherein, in this connection, the extremities of the input links of a first and a second segment are spaced at a distance suitable for the coupling means of both input links to engage, and
   wherein the connecting link of the last four-bar linkage comprises an additional hinge point configured to accommodate an extremity of the forward or rearward outer segment that is spaced at a distance for the coupling means of the input link and the forward or rearward outer segment to engage.

8. The foldable solar panel assembly according to claim 1, wherein in side view during the unfolding odd numbered segments of the at least one articulated support arm mechanism rotate clockwise and even numbered segments rotate counter-clockwise, and during the folding the rotation of each segment is in the opposed direction to that during the unfolding, or wherein during the folding the odd numbered segments of the at least one articulated support arm mechanism rotate clockwise and the even numbered segments rotate counter-clockwise, and during the folding the rotation is in the opposed direction to that during the unfolding.

9. The foldable solar panel assembly according to claim 1, wherein the at least one articulated support arm mechanism comprises three or more segments, and wherein one of the three or more segments is positioned centrally and extends on either side of the frame.

10. The foldable solar panel assembly according to claim 1, comprising a rotary connection between the frame and the base, allowing rotation of the frame around a vertical axis.

11. The foldable solar panel assembly according to claim 1, wherein the base is:
fixed to the ground, or
positioned on a trailer that is comprises a connector to be mounted to a car, or
connected to a floating device, configured to operate the foldable solar panel assembly while floating and wherein the floating device is configured to rotate about a vertical axis to orient the deployed solar panels towards the sun, wherein the floating device comprises at least one semi-submersible platform or pontoon and/or comprises a submersed lower part providing buoyancy to keep the foldable solar panel assembly above the water.

12. The foldable solar panel assembly according to claim 1, further comprising at least one side panel assembly, wherein the side panel assembly is hingedly connected to the frame or to the base via a hinge, the side panel assembly extending away from the hinge in at least a horizontal direction, wherein the at least one side panel assembly comprises at least one articulated support arm mechanism,
wherein the at least one side panel assembly is moveable between a compact state and a deployed state, wherein when seen in front view a first number of side panel assemblies is connected to the frame on a left side of the frame and a second number of side panel assemblies is connected to the frame on a right side of the frame.

13. The foldable solar panel assembly according to claim 12, wherein, when viewed in top view, in the compact state a right end of a first side panel assembly is connected by a hinge to a right side of the frame and a left end of a second side panel assembly is connected by a hinge to a left side of the frame, or vice versa, and
wherein at least one solar panel supported by the first side panel assembly is located in front of at least one solar panel supported by the frame and at least one solar panel supported by the second side panel assembly is located behind the at least one solar panel supported by the frame.

14. A method for folding and/or unfolding a foldable solar panel assembly according to claim 1, between a compact and folded, undeployed position and an unfolded, deployed position, the method comprising:
applying a moment with the drive system to a segment of at least one articulated support arm mechanism of the foldable solar panel assembly, wherein the segments and the hinge devices couple the rotations of the segments to one another, in that, when a first segment rotates, a second segment which is connected via a hinge device to the first segment is forced to rotate relative to the first segment,
wherein each segment supports at least one solar panel which extends away from said segment over a horizontal distance,
wherein said hinge axes are oriented in a substantially horizontal direction.

15. The method for folding and/or unfolding a foldable solar panel assembly according to claim 14, wherein, during folding and unfolding of the foldable solar panel, a position of a centre of gravity of the combination of all the articulated support arm mechanisms does not substantially change.

* * * * *